COMMUNICATION SYSTEM TIME RECOVERY UNIT

Filed Oct. 30, 1967

22 Sheets-Sheet 1

INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT
Filed Oct. 30, 1967 22 Sheets-Sheet 5
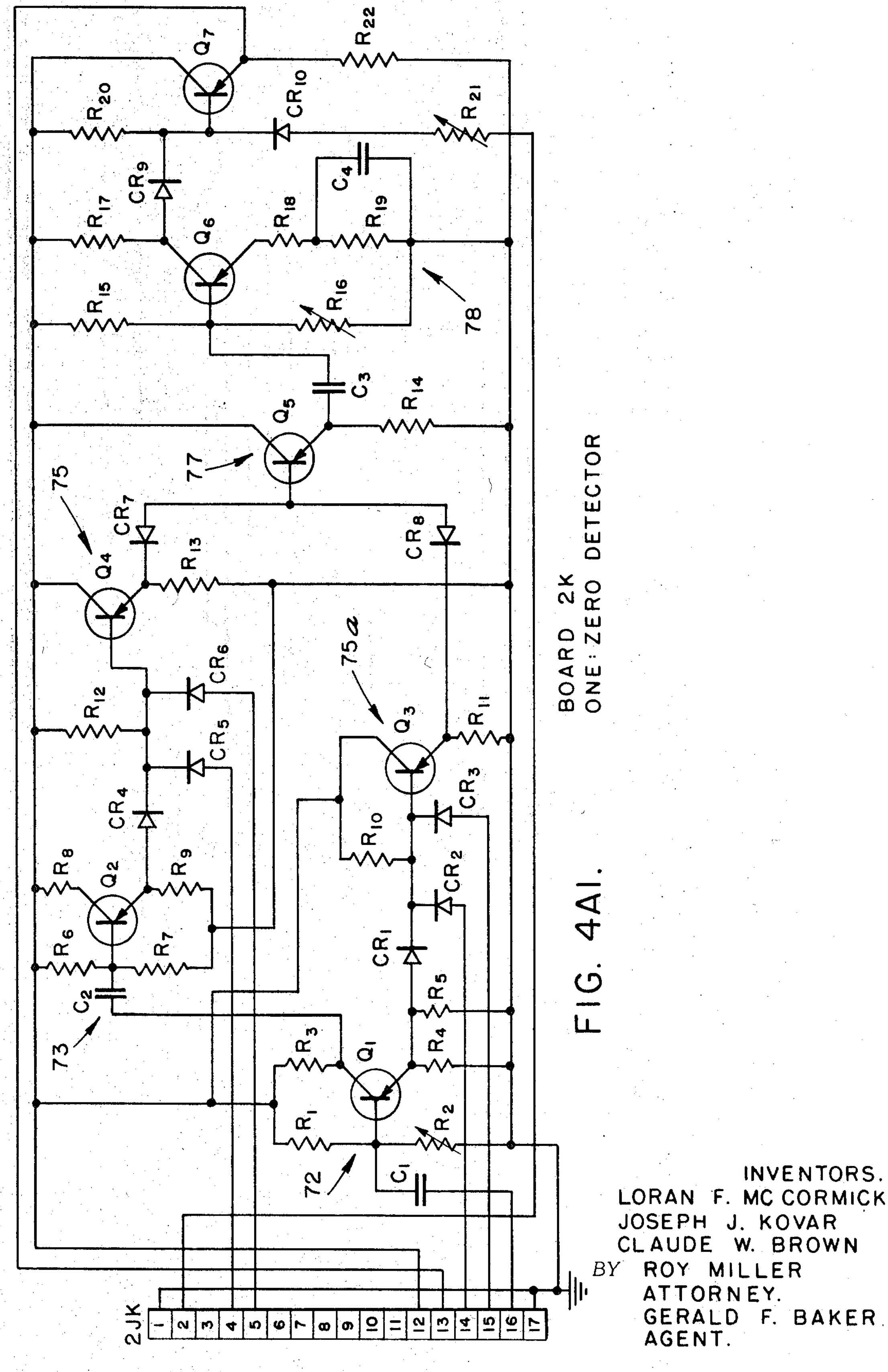
FIG. 4A1.
INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT
Filed Oct. 30, 1967 22 Sheets-Sheet 6
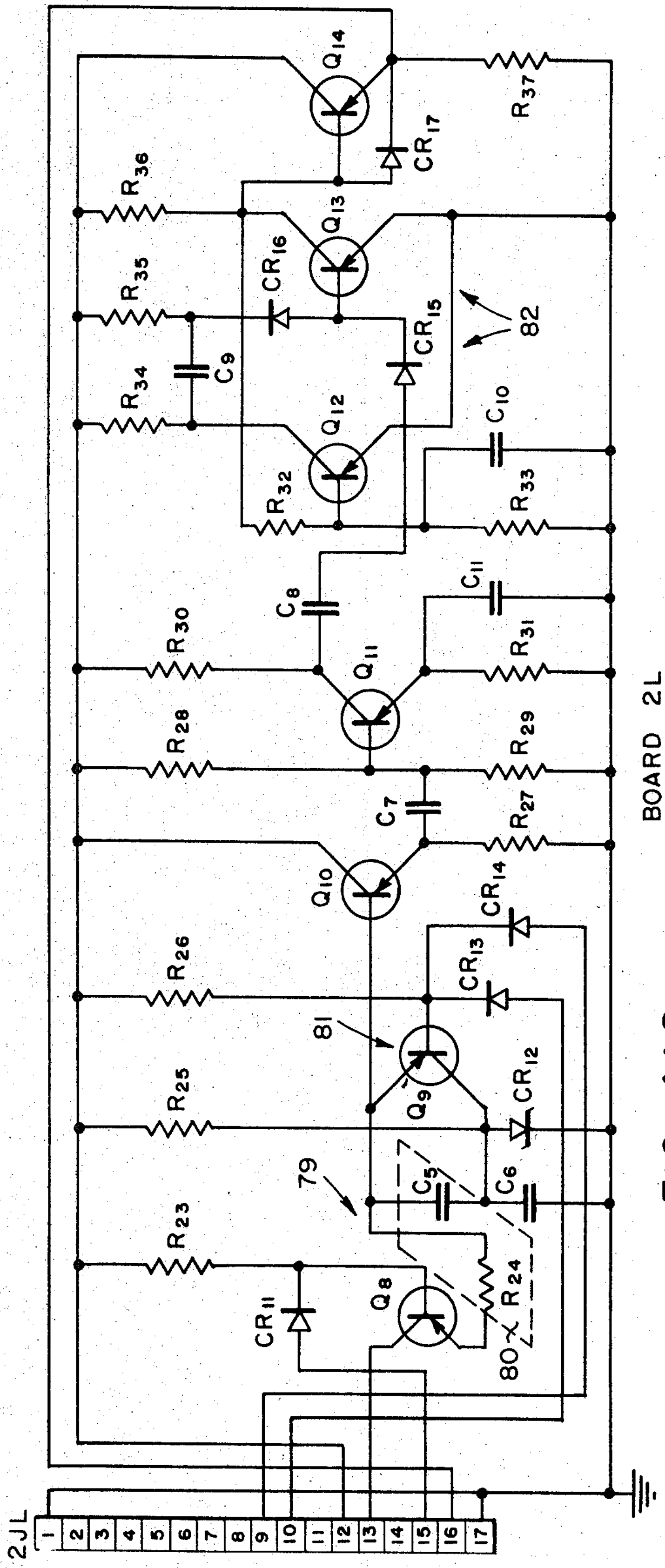
BOARD 2L
ONE : ZERO DETECTOR
FIG. 4A2.
INVENTORS.
LORAN F. McCORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

Filed Oct. 30, 1967 22 Sheets-Sheet 8

INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

Filed Oct. 30, 1967 22 Sheets-Sheet 11

INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

BOARD 2H
BIT SYNC ERROR DETECTOR

INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

INVENTORS.
LORAN F. MCCORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

Filed Oct. 30, 1967 22 Sheets-Sheet 18

INVENTORS.
LORAN F. MC CORMICK
JOSEPH J. KOVAR
CLAUDE W. BROWN
BY ROY MILLER
ATTORNEY.
GERALD F. BAKER
AGENT.

COMMUNICATION SYSTEM TIME RECOVERY UNIT

Filed Oct. 30, 1967 22 Sheets-Sheet 19

INVENTORS.
LORAN F. MC CORMICK
JOSEPH J. KOVAR
CLAUDE W. BROWN
BY ROY MILLER
ATTORNEY.
GERALD F. BAKER
AGENT.

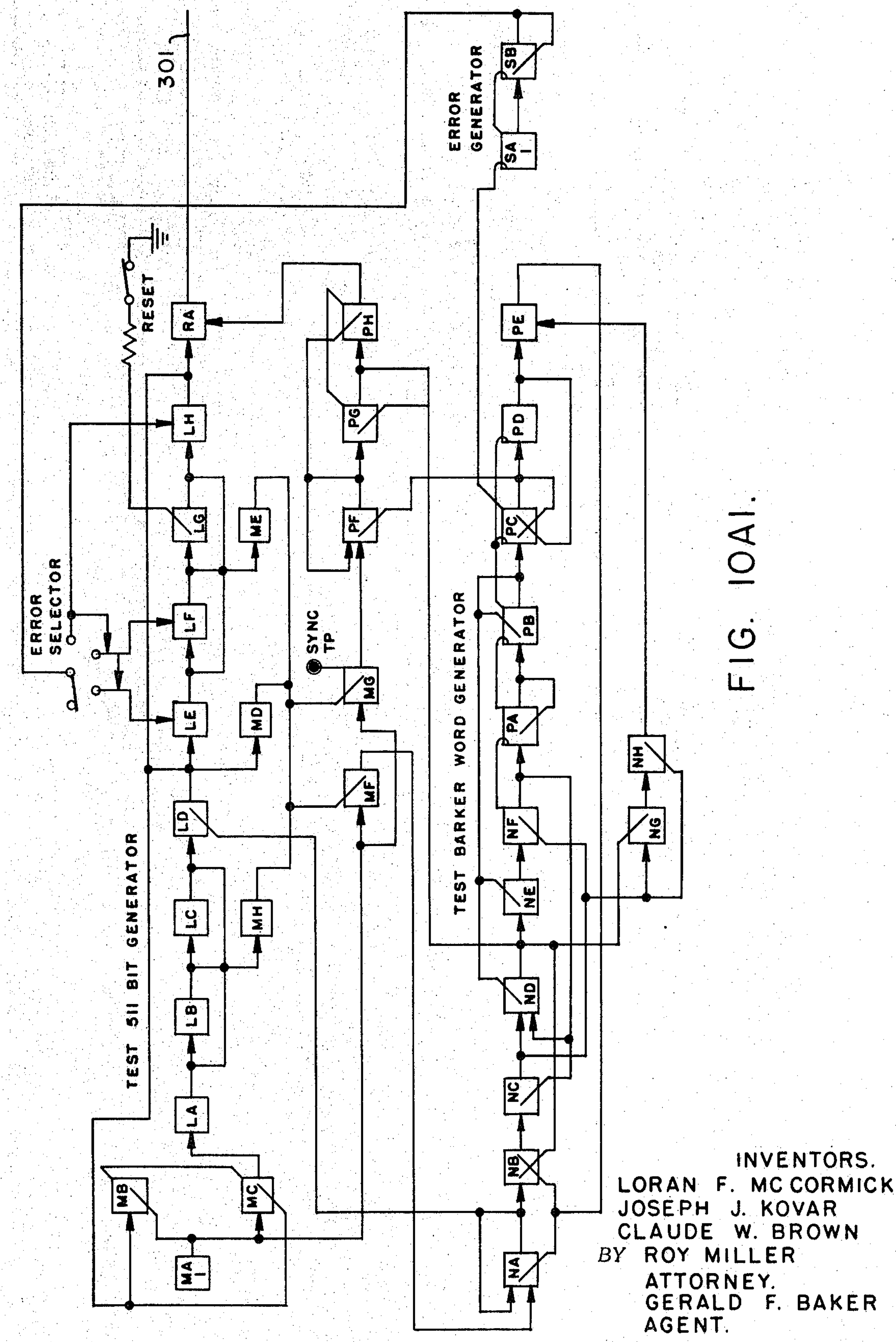
FIG. 10A1.
INVENTORS.
LORAN F. MC CORMICK
JOSEPH J. KOVAR
CLAUDE W. BROWN
BY ROY MILLER
ATTORNEY.
GERALD F. BAKER
AGENT.

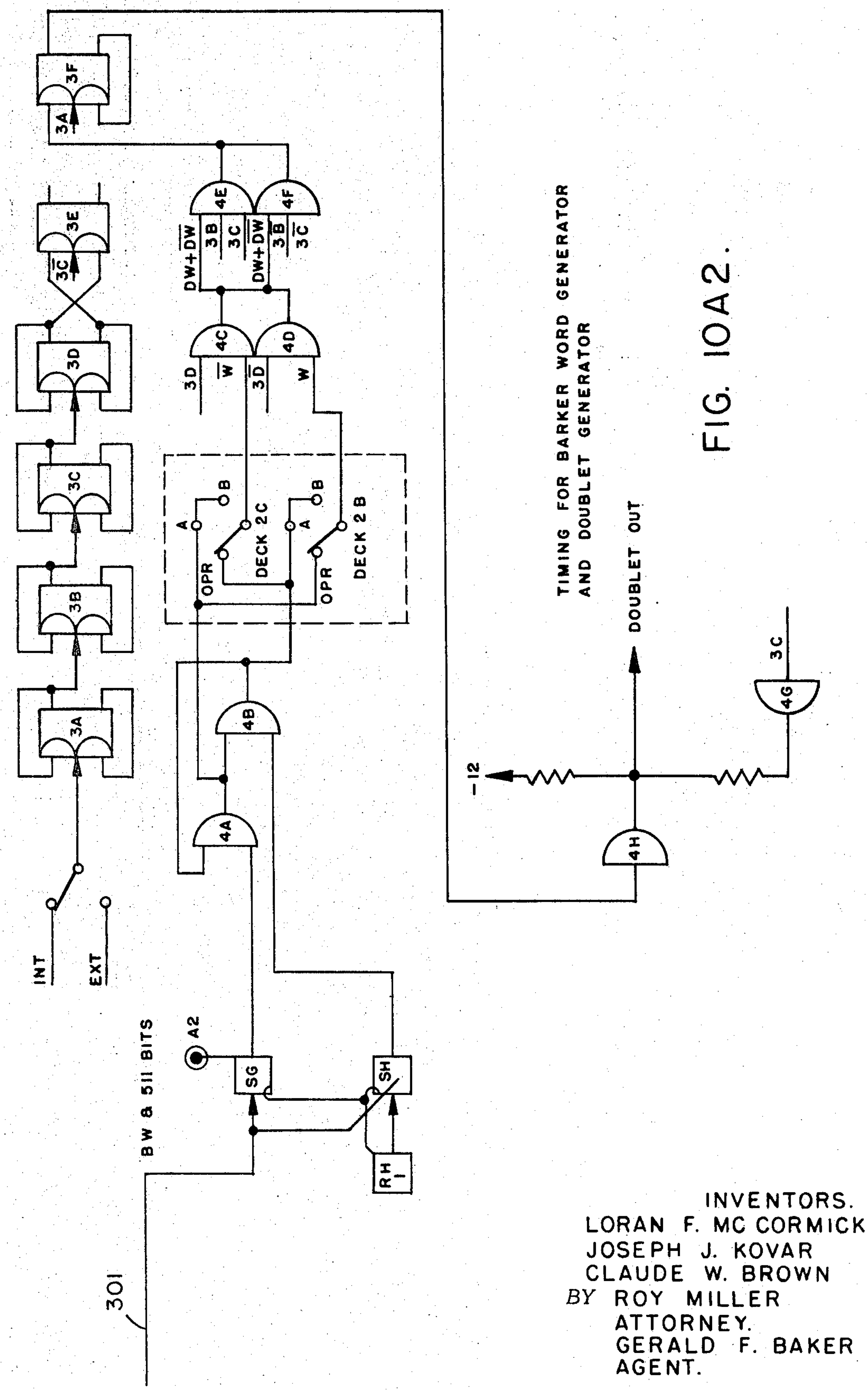
FIG. 10A2.
INVENTORS.
LORAN F. MC CORMICK
JOSEPH J. KOVAR
CLAUDE W. BROWN
BY ROY MILLER
ATTORNEY.
GERALD F. BAKER
AGENT.

INVENTORS.
LORAN F. MC CORMICK
JOSEPH J. KOVAR
CLAUDE W. BROWN
BY ROY MILLER
ATTORNEY.
GERALD F. BAKER
AGENT.

United States Patent Office 3,551,814
Patented Dec. 29, 1970

3,551,814
COMMUNICATION SYSTEM TIME RECOVERY UNIT

Loran F. McCormick, Canoga Park, and Joseph J. Kovar and Claude W. Brown, China Lake, Calif., assignors to the United States of America as represented by the Secretary of the Navy Filed Oct. 30, 1967, Ser. No. 679,060
Int. Cl. H04k *1/08*
U.S. Cl. 325—38 4 Claims

ABSTRACT OF THE DISCLOSURE

A Time Recovery Unit is provided in conjunction with a communications receiver and designed to issue an output pulse a specific length of time after a coded signal has been received. The unit decodes the signal, identifies and separates the time signal from other data being received, establishes the proper time between identification and issuance of the pulse and then issues the pulse.

GOVERNMENT INTEREST

The invention described herein may be manufactured and used by or for the Government of the United States of America for governmental purposes without the payment of any royalties thereon or therefor.

BACKGROUND OF THE INVENTION

With the advent of space navigation, it became apparent that it would be necessary to determine time in remote localities with much greater accuracy than had heretofore been considered feasible. One attempt to improve accuracy involved the simultaneous setting of a number of relatively accurate portable clocks which were then hand carried to their respective localities. However, before the present invention was made, remote receiving stations found it impossible to determine the time of day with an accuracy of better than 1.0 ms. With the Time Recovery Unit, which forms the present invention, it is possible to synchronize and detect the data transmitted by a remote transmitter, detect and decode time information transmitted on the same signal with the data and accurately signal acquisition of the time information to within 1/10 millisecond.

SUMMARY OF THE INVENTION

The Time Recovery Unit is a component of a receiving station designed to receive a coded phase modulated signal from a remote transmitter in a 3 kc. bandwidth, for example in an earth orbiting vehicle, when the received signal has a signal-to-noise ratio as low as —12 db.

It is a primary object of the present invention to provide for the accurate detection and decoding of low level signals from the remote transmitter such as in a satellite.

Another object of the invention is to obtain accurate time correlation for synchronizing a receiver in response to a sequence of binary information bits received with the data.

A further object of the invention is to provide reliable low level signal reception identification and decoding in a 3 kc. bandwidth when the signal-to-noise ratio is as low as —12 db.

Other objects, advantages and novel features of the invention will become apparent from the following detailed description of the invention when considered in conjunction with the accompanying drawing.

BRIEF DESCRIPTION OF THE DRAWING

FIGS. 4A1 and 4A2 together constitute a schematic diagram of the ONE:ZERO Detector;

FIGS. 10A1 and 10A2 together form a logic diagram of the test section;

DETAILED DESCRIPTION OF THE INVENTION

Initially, it is considered advantageous to view the basic theory of operation of the unit, each function within the system being individually described and all functions being related one to another. Detailed analysis of individual circuits will follow.

Figures 1, 1A:
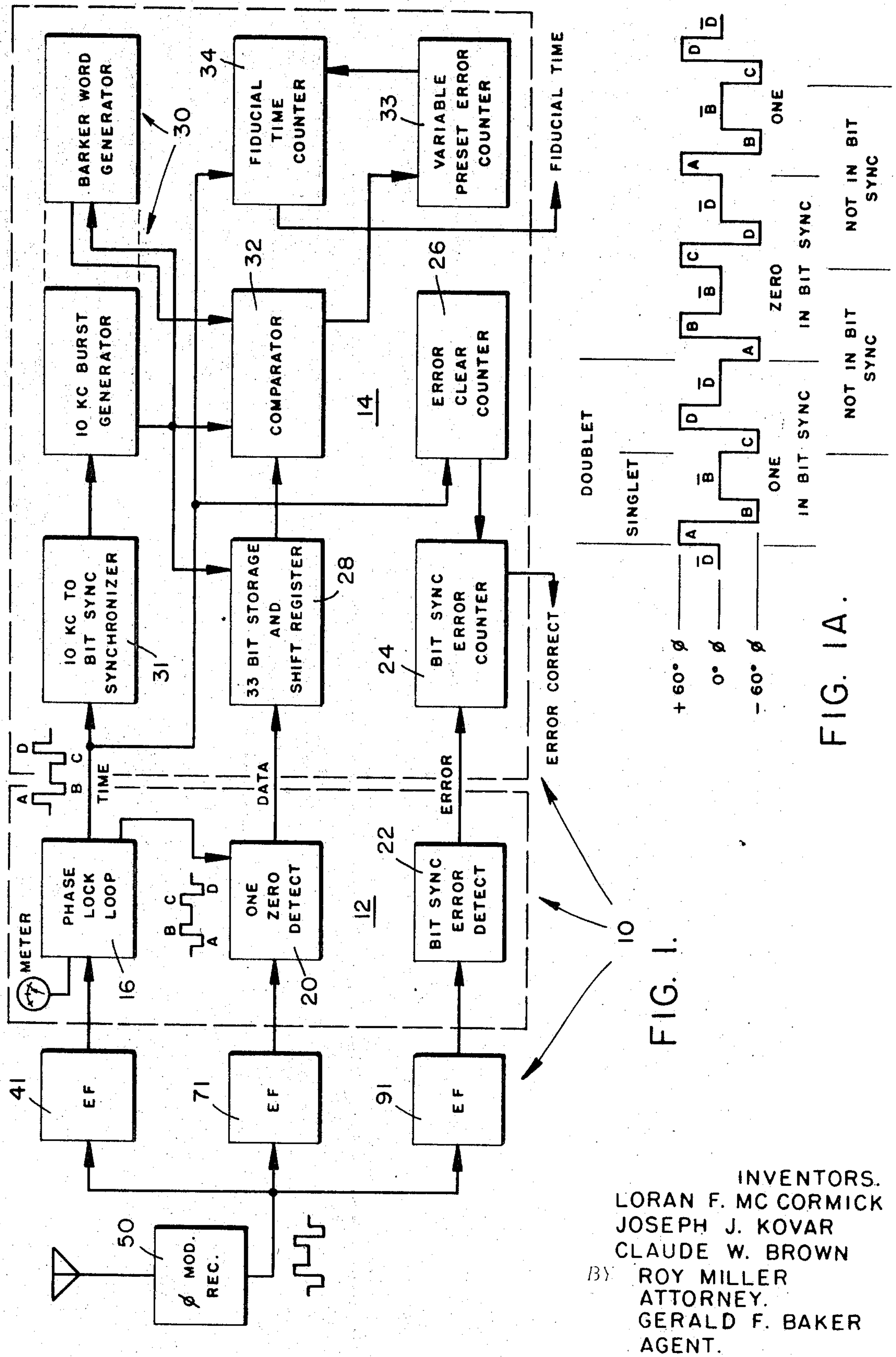
FIG. 1 is a simplified block diagram of the receiving system.
FIG. 1A is a diagrammatic representation of the basic input waveform.

Reference is now made to FIG. 1 which is a block diagram of the receiver system including the Time Recovery Unit 10. The basic function of the Time Recovery Unit 10 is that of issuing an output pulse a specific length of time after a coded signal (FIG. 1A) has been received. The unit must, therefore, decode this signal, identify, and separate it from the other data being transmitted, establish the proper time between identification and issuance of the pulse, and then issue the pulse. In addition, the Time Recovery Unit is capable of ensuring that it is properly synchronized with the input signals to be certain that the coded signal can be decoded. In practice, circuits are built into the unit for checkout and test.

The following circuits form the Time Recovery Unit 10: a Phase Lock Loop 16, a ONE:ZERO Detector 20, a BIT SYNC Erorr Detector 22, a BIT SYNC Erorr Counter 24, a BIT SYNC Error Clear Counter 26, a 33-Bit Storage and Shift Register 28, a Barker Word Generator 30, a 10 kc. to BIT SYNC SYNCHRONIZER 31, a Comparator 32, a Variable Preset Erorr Counter 33 and a Fiducial Time Counter 34. The unit also comprises (FIGS. 10, 10A and 10A1), a 500-Bit Test Generator 202, a Barker Word Test Generator 204, an Error Test Generator 206, and a Doublet Test Generator 210. These circuits are divided into the three sections of the unit as follows:

The Analog Section 12: Phase Lock Loop 16, ONE: ZERO Detector 20, BIT SYNC Error Detector 22.
The Digital Section 14: BIT SYNC Error Counter 24, BIT SYNC Error Clear Counter 26, 33-Bit Storage and Shift Regitser 28, Barker Word Generator 30, 10 kc. to BIT SYNC Synchronizer 31, Comparator 32, Variable Preset Error Counter 33, Fiducial Time Counter 34.
The Test Section: 511-Bit Test Generator 202, Barker Word Test Generator 204, Error Test Generator 206, Doublet Test Generator 210.

The output of the receiver 50 is connected to the Analog Section 12. The Analog Section converts the doublet-coded information into time and data pulses which can be used by the Digital Section 14. The actual search for the coded signal occurs in the Digital Section 14 where a bit-by-bit comparison of the incoming signal against the internally generated Comparison Signal is made. When the sought-after coded signal is located, the Digital Section times and issues the fiducial output pulse. The Test Section is used to check the unit for proper operation.

ANALOG SECTION

Figure 2:
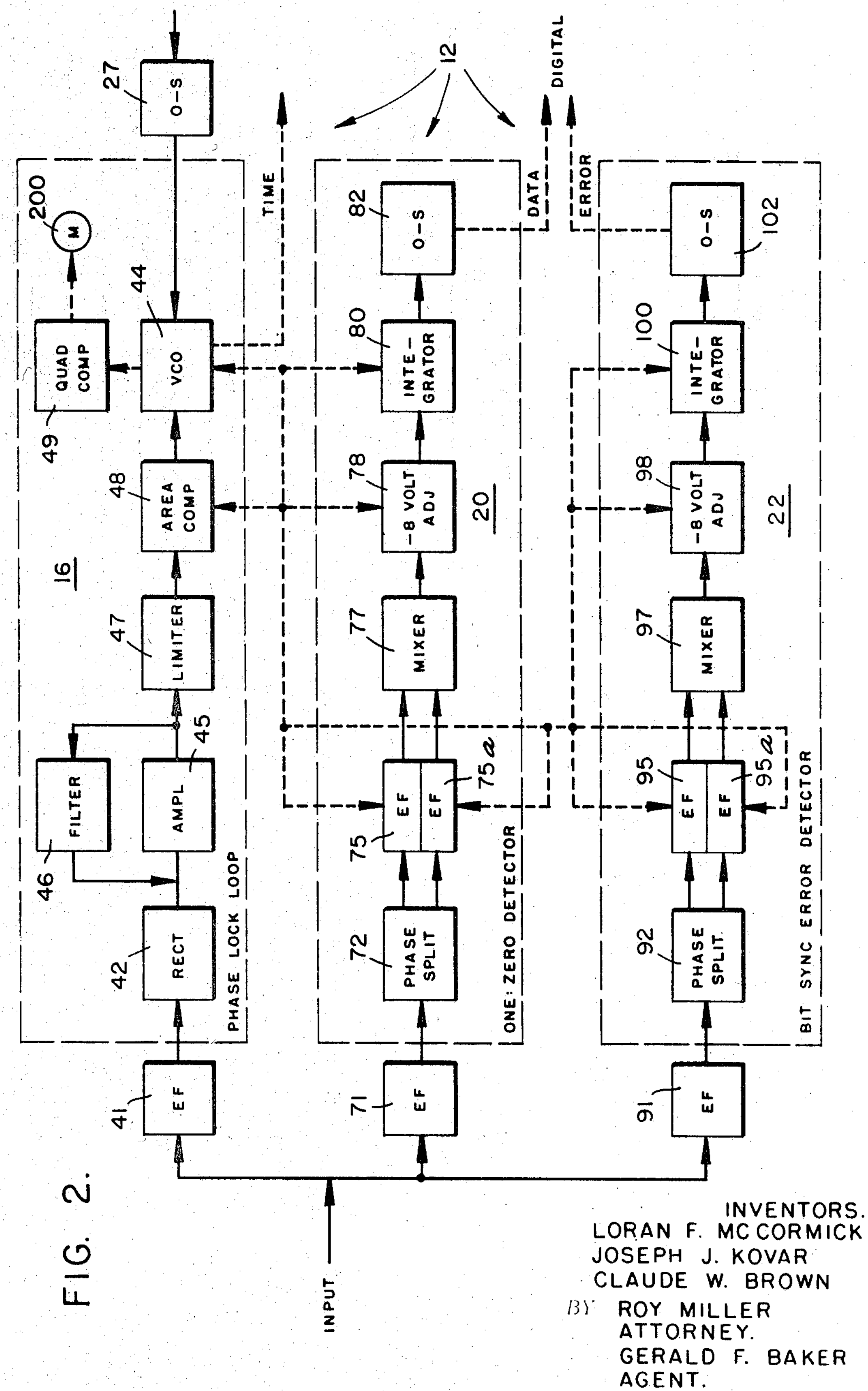
FIG. 2 is a simplified block diagram of the Analog Section.
Figures 3, 3A, 3B:
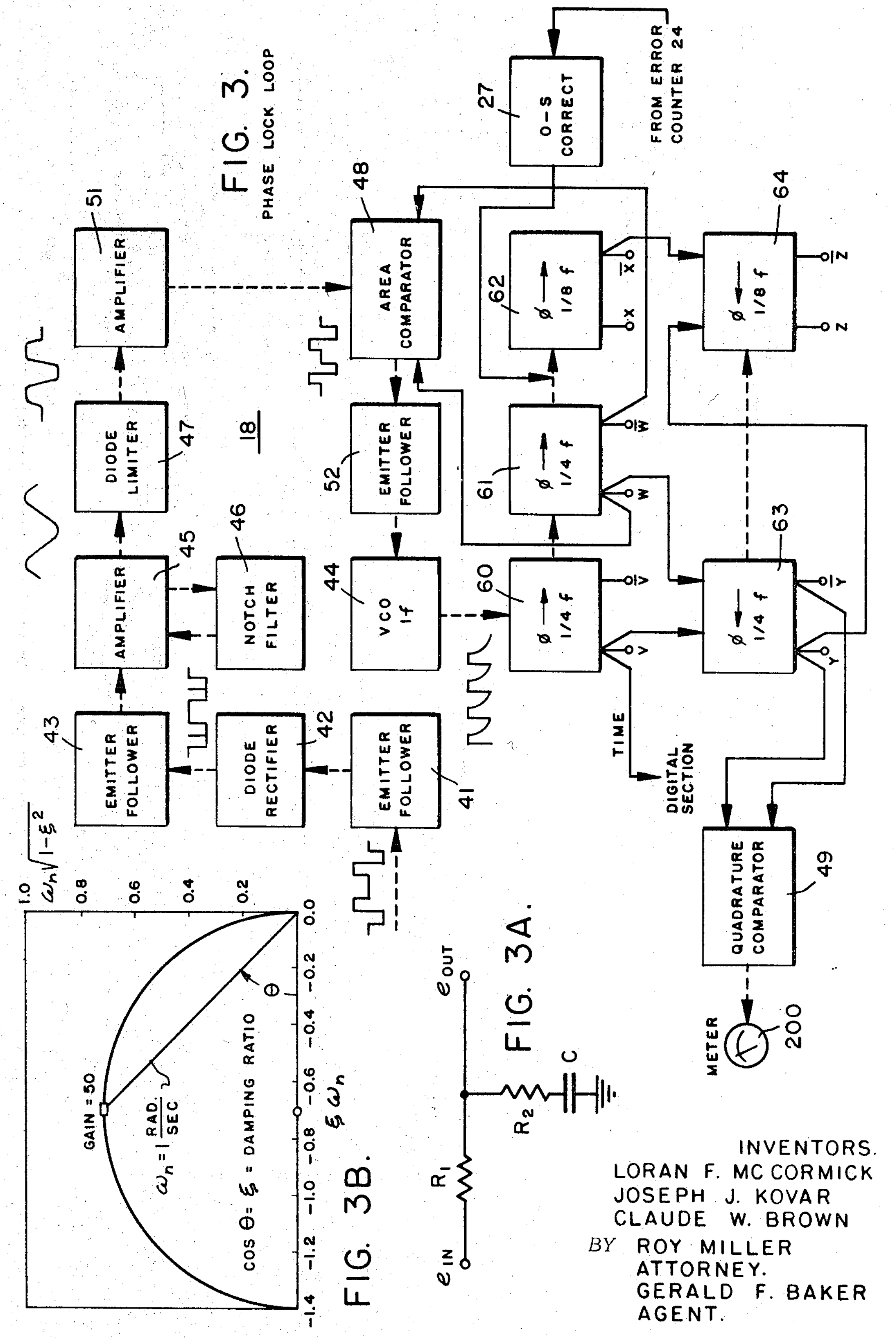
FIG. 3 is a block diagram of the Phase Lock Loop.
FIG. 3A is a circuit diagram of the filter for the Phase Lock Loop.
FIG. 3B is a graph showing the Root Locus Plot for Phase Lock Loop.

Referring now more particularly to FIGS. 1, 2 and 3, it may be seen that the input to the Analog Section is applied to three emitter follower stages EF 41, 71, 91 which serve to isolate the inputs from each other and to match the impedance of the inputs to the downstream circuitry. The input signal (FIG. 1A) arrives in the form of a coded series of phase-modulated positive and negative going bits. Each character consists of a phase modulated pulse with a 60-degree deviation followed immediately by a pulse of equal magnitude but opposite phase (see FIG. 1A). This is followed by a period, the duration of which is equal to the two preceding pulses, but at 0-degree deviation. The complement of the first pulse, followed by a 0-degree deviation equal to these two pulses then follows. FIG. 1A illustrates the shape of the input signal from the phase detector in the Phase-Modulated Receiver. The output of the receiver is supplied as the input of the Time Recovery Unit in the same essential form. FIG. 2 is a simplified block diagram of the Analog Section of the unit.

PHASE LOCK LOOP

The Phase Lock Loop 18 synchronizes the "gating signals" to the input signal. This condition is known as LOCK and occurs whether or not the system is in BIT SYNC. The gating signals are the product of the Phase Lock Loop.

The input signal is rectified by diode rectifier 42 after passing through the input emitter follower 41, and the resultant modulated DC signal is passed through another emitter follower 43 into an amplifier 45. This amplifier has a degenerative feedback loop containing notch filter 46. The notch is tuned to the fundamental frequency of the signal and the feedback thus greatly attenuates all but the fundamental signal. Circuit gain is low in order to prevent oscillation.

The output of the feedback amplifier 45 is passed through a diode limiter 47. The clipping level of the limiter is selected to allow high sensitivity in downstream stages, permitting the circuit to funtcion at low signal levels and still permit high amplitude input signals. The clipping level is such that almost all signals passing through the limiter are slightly clipped. Waveform is not critical at this point in the circuit.

The next stage is a high-gain amplifier stage 51. This is used to drive the area comparator 48. The area comparator 48 (a phase comparison circuit) compares the difference in phase between the signal from the amplifier stage and the signal from a voltage controlled oscillator (VCO) 44. The area comparator 48 provides a driving voltage for the VCO 44. This voltage is dependent upon the phase difference between the two signals. Drive to the VCO passes through the emitter follower 52.

The VCO drives five flip-flop frequency dividers 60, 61, 62, 63, 64. Three of the dividers are out of phase with the original input signal, and two are in phase with the original input signal. The out-of-phase flip-flops run at ½, ¼, and ⅛ the frequency (*f*) of the VCO. The in-phase flip-flops run at ¼*f* and ⅛*f*. Each flip-flop produces two outputs as identified in Table 1. These flip-flop outputs are the gating signals for the remainder of the Analog Section and the BIT SYNC CLOCK pulses for the Digital Section.

TABLE I.—GATING SIGNALS

[Frequency divider flip-flop output coding designations]

| Flip-flop | Normal | Complement |
|---|---|---|
| 1/2*f*, Out of phase | V | $\overline{V}$ |
| 1/4*f*, Out of phase | W | $\overline{W}$ |
| 1/8*f*, Out of phase | X | $\overline{X}$ |
| 1/4*f*, In phase | Y | $\overline{Y}$ |
| 1/8*f*, In phase | Z | $\overline{Z}$ |

LOCK Meter Driver

A quadrature comparator 49, driven by the Y and $\overline{Y}$ outputs of the ¼*f* in-phase flip-flop 63, drives a LOCK meter 200. The meter indicates LOCK when it stabilizes at a high level reading.

ONE:ZERO Detector (FIGS. 4, 4A1 and 4A2)

The ONE:ZERO Detector 20 decodes the original input signal and converts the coded information into ONE and ZERO binary bits for the Digital Section 30. The actual output is in the form of a ONE count for each coded ONE in the original input signal, and no output (equal to a ZERO count) for each ZERO in the original input signal.

The input to the ONE:ZERO Detector is applied to a phase splitter 72 through an emitter follower 71. Of the two outputs of the phase splitter, the complementary output (180° to the input) is passed through a DC restoring circuit 73 to bring the DC level of the signal up to the DC level of the identical output (in phase with the input). Both outputs of the phase splitter are applied to the input of a gated emitter 75, **75*a*** follower through an isolating diode. Each of the gated emitter followers is double gated and requires two gating signals to conduct.

Gated emitter follower 75, handling the complementary signal, is gated by gating signals $\overline{Y}$ and $\overline{X}$ (see FIGS. 4 and 4B) and conducts during times B and C but not during times A, D, $\overline{B}$, and $\overline{D}$. Gated emitter follower **75*a*** handling the identical signal, is gated by gating signals X and $\overline{Y}$ and conducts during times A and D but not during times B, C, $\overline{B}$, and $\overline{D}$.

Figures 4, 4C:
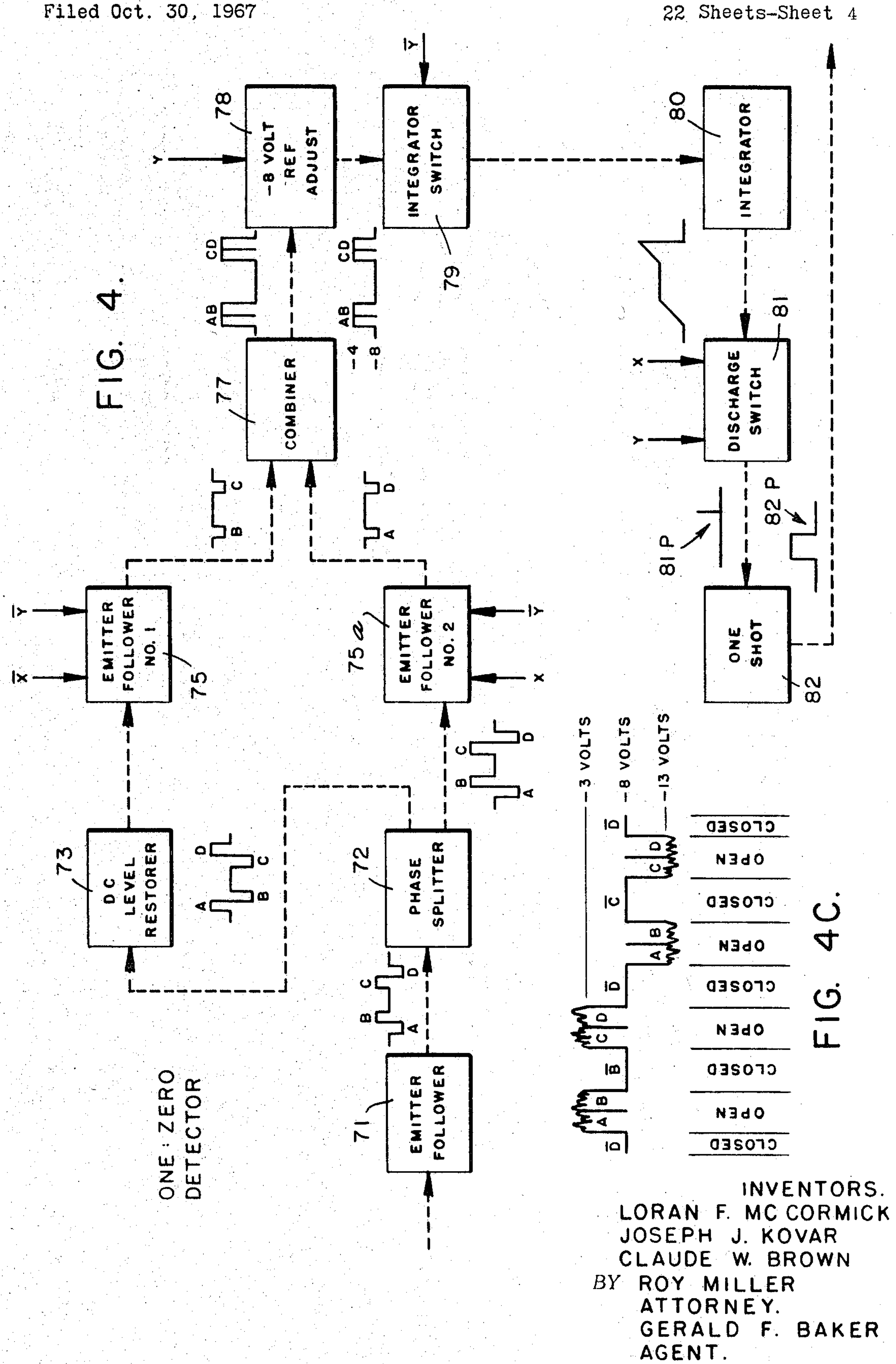
FIG. 4 is a block diagram of the ONE:ZERO Detector.
FIG. 4C is a diagrammatic representation of a typical ONE:ZERO count.

The outputs of the two gated emitter followers, 75, **75*a*, are added in the combiner 77. The combiner 77 is a simple diode mixer followed by an emitter follower. A −8 volt DC reference adjusting circuit 78** follows the emitter follower. This circuit establishes the base line bias voltage at −8 volts DC and also acts as a noise gate. This latter is accomplished by using a single gate similar in nature to the gates in the gated emitter followers. In this circuit, the gate conducts during times AB and CD, and does not conduct during times $\overline{B}$ and $\overline{D}$. FIG. 4C illustrates a typical ONE, ZERO count in this circuit.

Figure 4B:
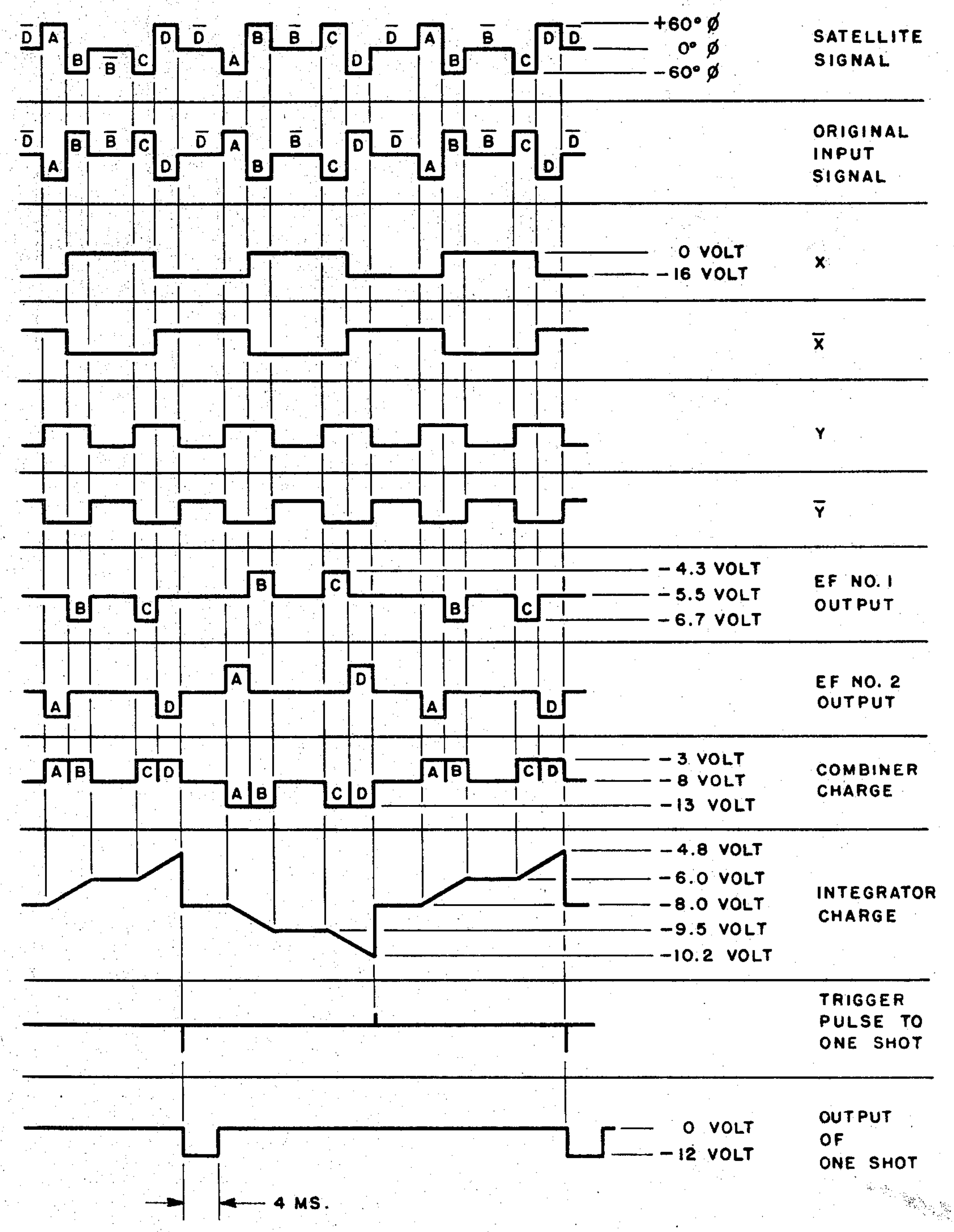
FIG. 4B is a graphic representation of a typical waveform history in the ONE:ZERO Detector.

The output of the −8 volt adjust circuit 78 is applied to the input of the integrator switch 79. The integrator switch consists of a solid-state switch, actually a transistor in series with the integrator 80, controlled by a gating signal. The transistor is gated by the $\overline{Y}$ gating signal which causes the switch to conduct during times AB and CD and not during times $\overline{B}$ and $\overline{D}$. Refer to FIG. 4B for a history of the various signal and gating waveforms for the ONE:ZERO Detector.

The integrator 80 charges to some fraction of the potential of the signal while the switch 79 is conducting. The integrator 80 is discharged after every second input pulse. Integrator discharge is controlled by another gated solid-state switch 81. This switch is double-gated and is controlled by the Y and X gating signals. The integrator is discharged through the discharge switch 81. The transistor in the discharge switch is wired into the circuit so as to provide a larger negative-going pulse than a positive-going pulse. Since the pulse provided is generated in the same polarity as the direction of discharge, a negative-going discharge (−4.8 volts to −8.0 volts) results in an appreciable pulse, while a positive-going discharge (−10.5 volts to −8.0 volts) results in negligible output.

The output pulse 81P of the integrator 80 is used to trigger a one-shot multivibrator 82. The one-shot is triggered only by negative pulses and, when triggered, delivers a 4 ms. long −12 volts square pulse 82P.

The design of the circuit is such that each doublet ONE results in an output pulse from the one-shot. Each doublet ZERO results in no output from the one-shot.

BIT SYNC Error Detector

Figures 5, 5A:
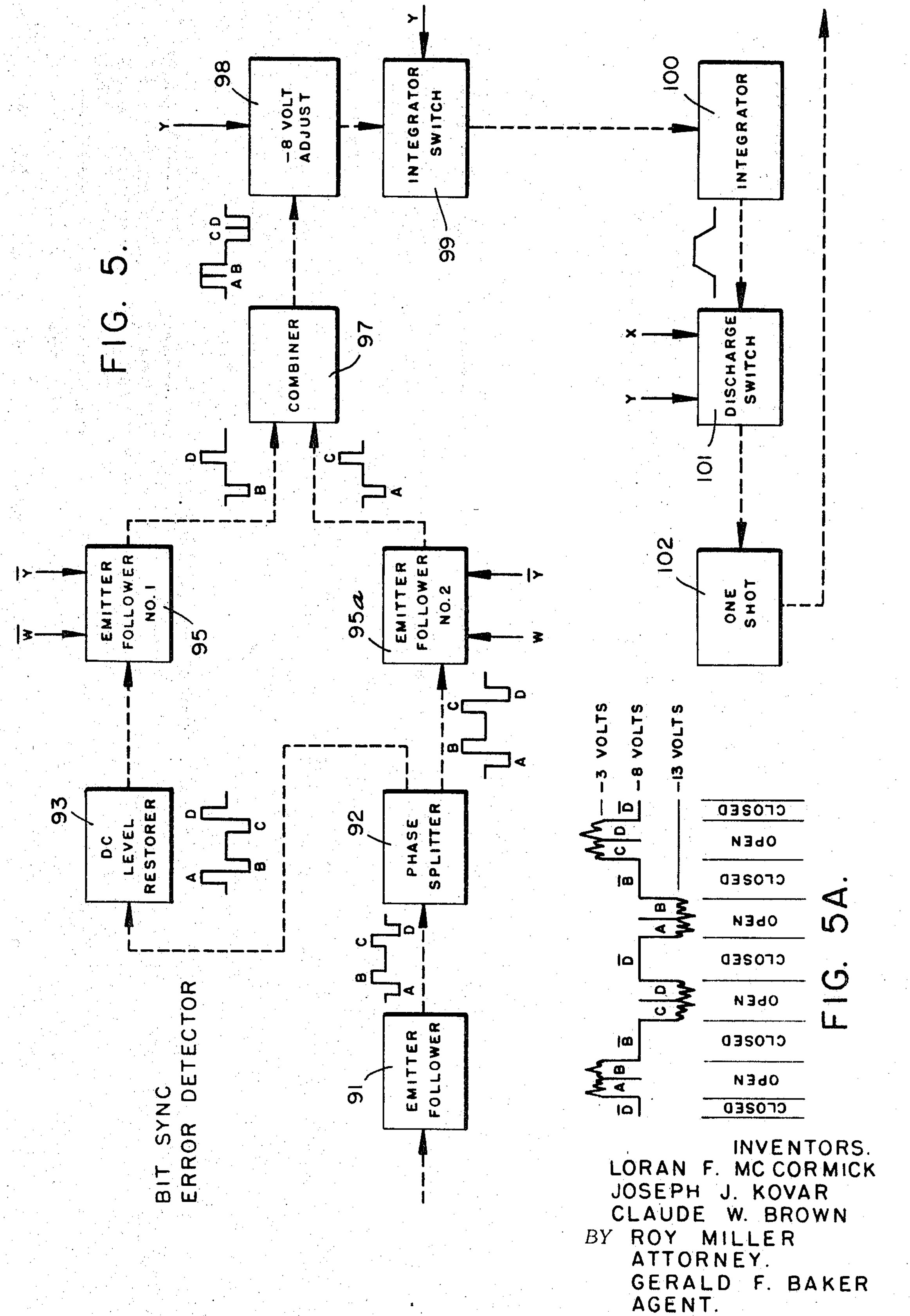
FIG. 5 is a block diagram of the BIT SYNC Error.
FIG. 5A is a graphic showing of a typical ONE:ZERO count in the BIT SYNC Error Detector.

As shown in FIG. 5, almost all the circuitry and circuit functions in the BIT SYNC Error Detector 22 are the same as those in the ONE:ZERO Detector 20. Except for the absence of one capacitor in the BIT SYNC Error Detector and differences in the connection of the gating signals, the two circuits are identical. FIG. 5 is a block diagram of the BIT SYNC Error Detector 22.

Where the ONE:ZERO Detector is designed to issue an output pulse each time a doublet ONE is received, the BIT SYNC Error Detector is designed to issue no output pulse so long as the unit is IN BIT SYNC. However, when the unit is $\overline{\text{IN}}$ BIT SYNC, the BIT SYNC Error Detector produces an output pulse each time a doublet ONE is followed by a doublet ZERO. The BIT SYNC Error Detector cannot determine the unit is $\overline{\text{IN}}$ BIT SYNC when either a series of doublet ONE or doublet ZERO counts are received, and only issues a BIT SYNC ERROR PULSE when a doublet ONE count is followed by a doublet ZERO count, and only when the units $\overline{\text{IN}}$ BIT SYNC.

The first stages of the BIT SYNC Error Detector function like the similar stages in the ONE:ZERO Detector. The input signal is passed through an emitter follower 91 into a phase splitter 92. The complementary signal from the phase splitter is passed through a DC restorer 93 and into a gated emitter follower 95. The identical signal is applied directly to a gated emitter follower **95*a***.

Emitter follower 95 in the BIT SYNC Error Detector is gated by gating signals $\overline{W}$ and $\overline{Y}$. It is open during times B and D, and is closed during times A, C, $\overline{B}$, and $\overline{D}$. Emitter follower **95*a*** is gated by gating signals W and $\overline{Y}$, and is open during times A and C. It is closed during times B, D, $\overline{B}$, and $\overline{D}$.

The output of the two emitter followers are mixed in the mixer or combiner 97. Refer to FIG. 5A for a typical waveform in the −8 volt reference adjust 98. The −8 volt reference adjust 98 is gated by the Y gating signal.

Figure 5B:
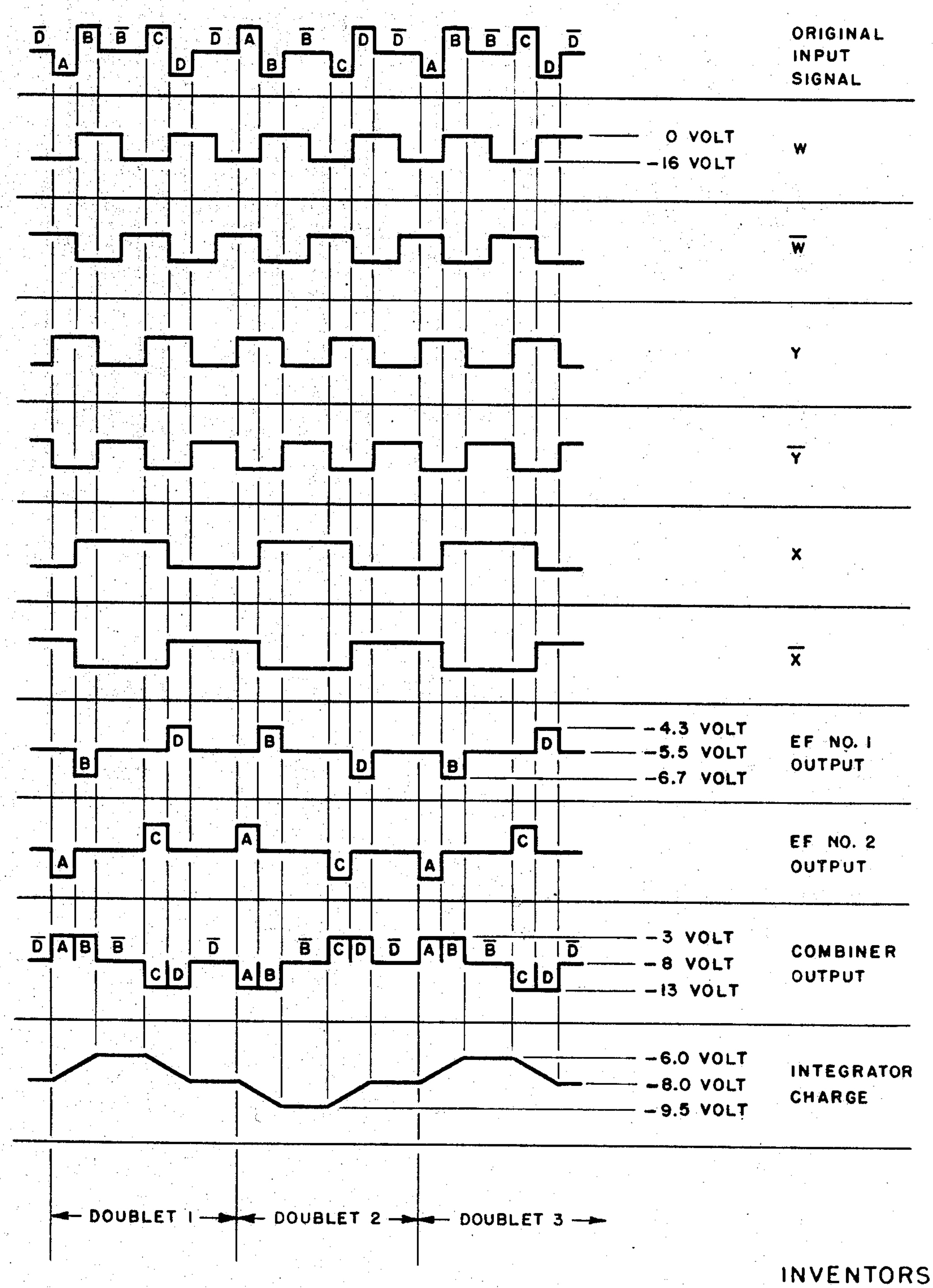
FIG. 5B is a graphic representation of a typical waveform history in the BIT SYNC Error Detector, IN BIT SYNC.

The integrator switch 99 is gated by the $\overline{Y}$ gating signal and the discharge switch 101 is gated by the X and Y gating signals. The integrator 100 charges in the same manner as the integrator 80 in ONE:ZERO Detector but with a different waveform. Refer to FIG. 5B for the waveform history of the BIT SYNC Error Detector IN BIT SYNC, and FIG. 5C for the waveform history $\overline{\text{IN}}$ BIT SYNC. These should be compared with FIG. 4B to illustrate the difference in function between the ONE:ZERO Detector and the BIT SYNC Error Detector.

DIGITAL SECTION

Figure 6:
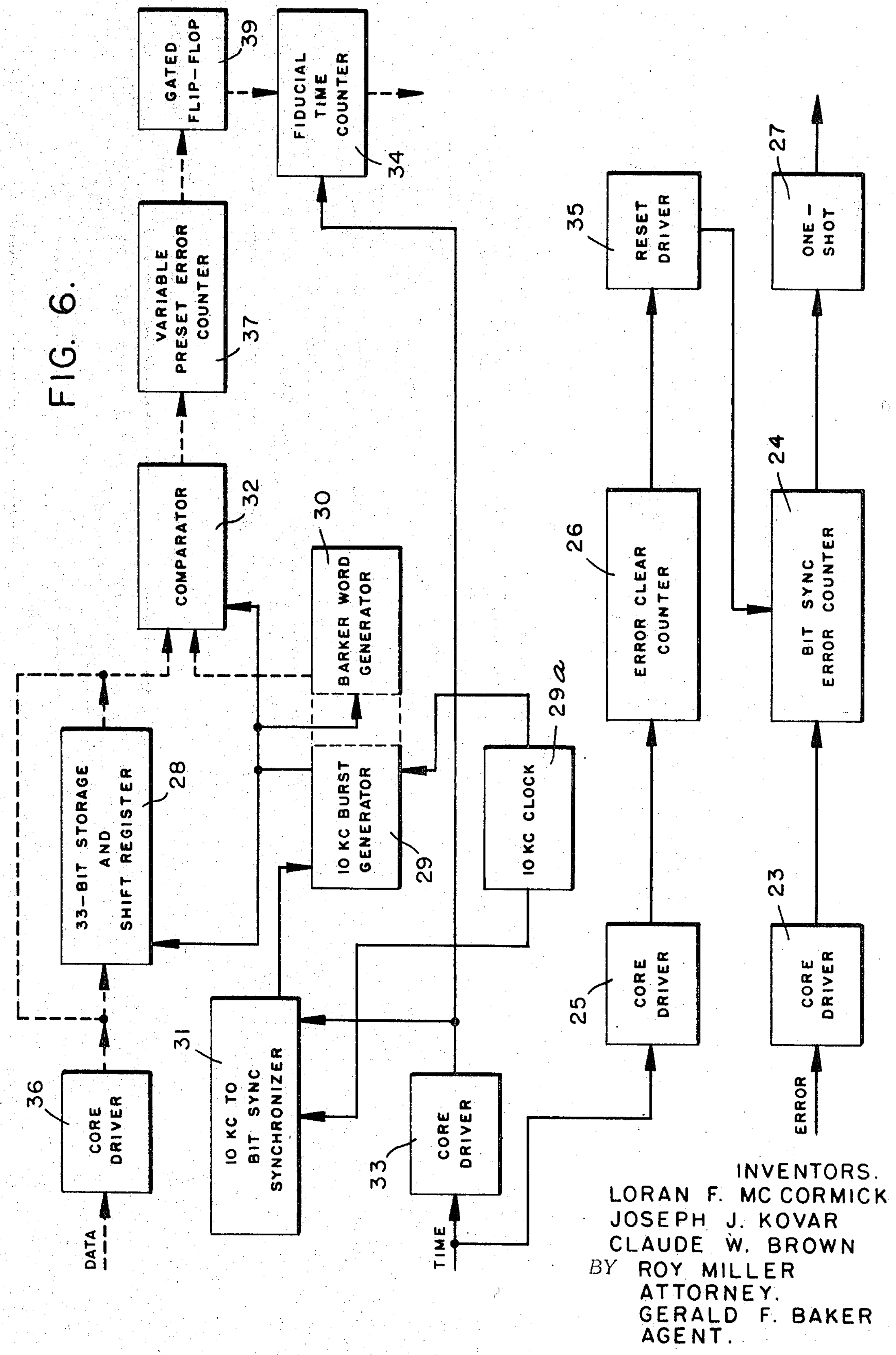
FIG. 6 is a simplified block diagram of the Digital Section.

There are three inputs to the Digital Section (see FIG. 6) DATA, ERROR and TIME: Data, decoded counts from the ONE:ZERO Detector 20; Error, BIT SYNC ERROR pulses from the BIT SYNC Error Detector 22; and Time, BIT SYNC CLOCK pulses from the VCO 44 in the Phase Lock Loop 12. Data pulses are applied to the input of the 33-Bit Storage and Shift Register 28; Error pulses are applied to the input of the BIT SYNC Error Counter 24; and Time pulses are applied to the inputs of the BIT SYNC Error Clear Counter 24; and Time pulses are applied to the inputs of the BIT SYNC Error Clear Counter 26, the Synchronizer 31 for the 10 KC Burst Generator 29, and the Fiducial Time Counter 34. FIG. 6 is a simplified block diagram of the Digital Section and FIGS. 7 and 7A constitute a logic diagram of the Digital Section.

BIT SYNC Error Counter

Input to the BIT SYNC Error Counter 24 is through a core driver 23. The counter is a simple binary counter to the base 9 and is constructed of magnetic logic cores. Each ninth error count results in an output pulse from the counter. This output pulse triggers a one-shot. The one-shot (also shown in FIG. 3) adds a count to the output of the VCO 44 between the ¼ *f* and ⅛ *f* out-of-phase flip-flops. The extra count shifts the scanning sequence of the gating signals. This causes the gated emitter followers 75, **75*a* in the ONE:ZERO Detector and 95, 95*a*** in the BIT SYNC Error Detector to change the point at which they scan the doublets.

BIT SYNC Error Clear Counter

The BIT SYNC Error Clear Counter 26 is driven through a core driver 25 by a ½ *f* in-phase output of the VCO 44 (see FIG. 3). The counter 26 is a simple binary counter to the base 64. Every 64th BIT SYNC CLOCK PULSE (the ½ *f* in-phase flip-flop output 60V) results in an output from the counter 26. This output is applied to a reset driver 35 (similar to a core driver) which is connected to all the RESET connections of the BIT SYNC Error Counter 24. The BIT SYNC Error Reset Counter is RESET every 64 BIT SYNC CLOCK pulses to prevent an erroneous BIT SYNC correction due to data lost in transmission.

Barker Word Generator

The Barker Word Generator 30 is a pseudo-random pattern generator whose output is the Barker Word. The Barker Word is a 33-bit pattern of ONE and ZERO pulses. The pattern is: 111000100101110001001000011101101, and is made up of three parts. Each part is an 11-bit phrase (11100010010) or its complement (00011101101). The Barker Word consists of the phase, the phrase repeated, and the complement. Thus, the Barker Word may be stated as BW, BW, $\overline{BW}$.

The 33-bit pattern is generated at a 10 kc. rate each time a BIT SYNC CLOCK pulse arrives from the VCO. The generation of the Barker Word at a 10 kc. rate also provides a 10 kc. output for other purposes.

The BW, BW, $\overline{BW}$ output of the Barker Word Generator is fed to the input of the Comparator 32.

10 KC to BIT SYNC Synchronizer

The 10 kc. output of the clock 29*a* (FIG. 6) and the BIT SYNC CLOCK pulses from the VCO 44 are both applied to the synchronizer 31. The synchronizer outputs a 10 kc. wave that is synchronized with the BIT SYNC CLOCK pulses. That is, the leading edge of each synchronized BIT SYNC CLOCK pulse will occur simultaneously with the leading edge of a 10 kc. pulse. This ensures complete synchronization between internal and external clocks.

33-Bit Storage and Shift Register

Input to the 33-Bit Storage and Shift Register 28 is from the output of the ONE:ZERO Detector 20 applied through a core-driver 36. Shift drive to the register 28 is applied through a core-driver AA (FIG. 7) from the output of the 10 kc. Burst Generator, 29.

The 10 kc. output of the 10 kc. Burst Generator 29, which is derived from the thirty-four 10 kc. square-wave pulses produced by the Barker Word Generator 30, shifts the register 28 a total of 34 times. Each time the register is shifted, the bit in the last stage is shifted out to the input of the Comparator 32 and is run-around to the first stage of the register 28. On the next-to-last shift (the 33rd), all the bits are in their original positions, with the exception of the 33rd bit. The input to the last stage of the register is inhibited on the next-to-last shift, leaving the stage in its ZERO condition. When, on the last shift (the 34th), all the bits are shifted one stage, the ZERO from the last stage is rung around to the first stage, leaving the first stage in its ZERO condition. The ZERO output does not affect the Comparator.

This process has advanced the 33 bits in storage one stage and has eliminated the last (33rd) bit, leaving 32 bits in the register and leaving the first stage ready for the next bit from the ONE:ZERO Detector. If the next bit is a ONE, the first stage will be set to its ONE condition. If the next bit is a ZERO, the stage will remain in its ZERO condition (a ZERO input is identical to no input at all) (refer to FIG. 4B, and ONE:ZERO DETECTOR above). The new bit (data input) occurs midway between BIT SYNC CLOCK (time input) pulses and, since the synchronizer ensures that the first 10 kc. pulse occurs simultaneously with the leading edge of the synchronized BIT SYNC CLOCK pulse, there is more than ample time for the generation of the thirty-four 10 kc. pulses to shift the entire register.

Comparator

Figure 7:
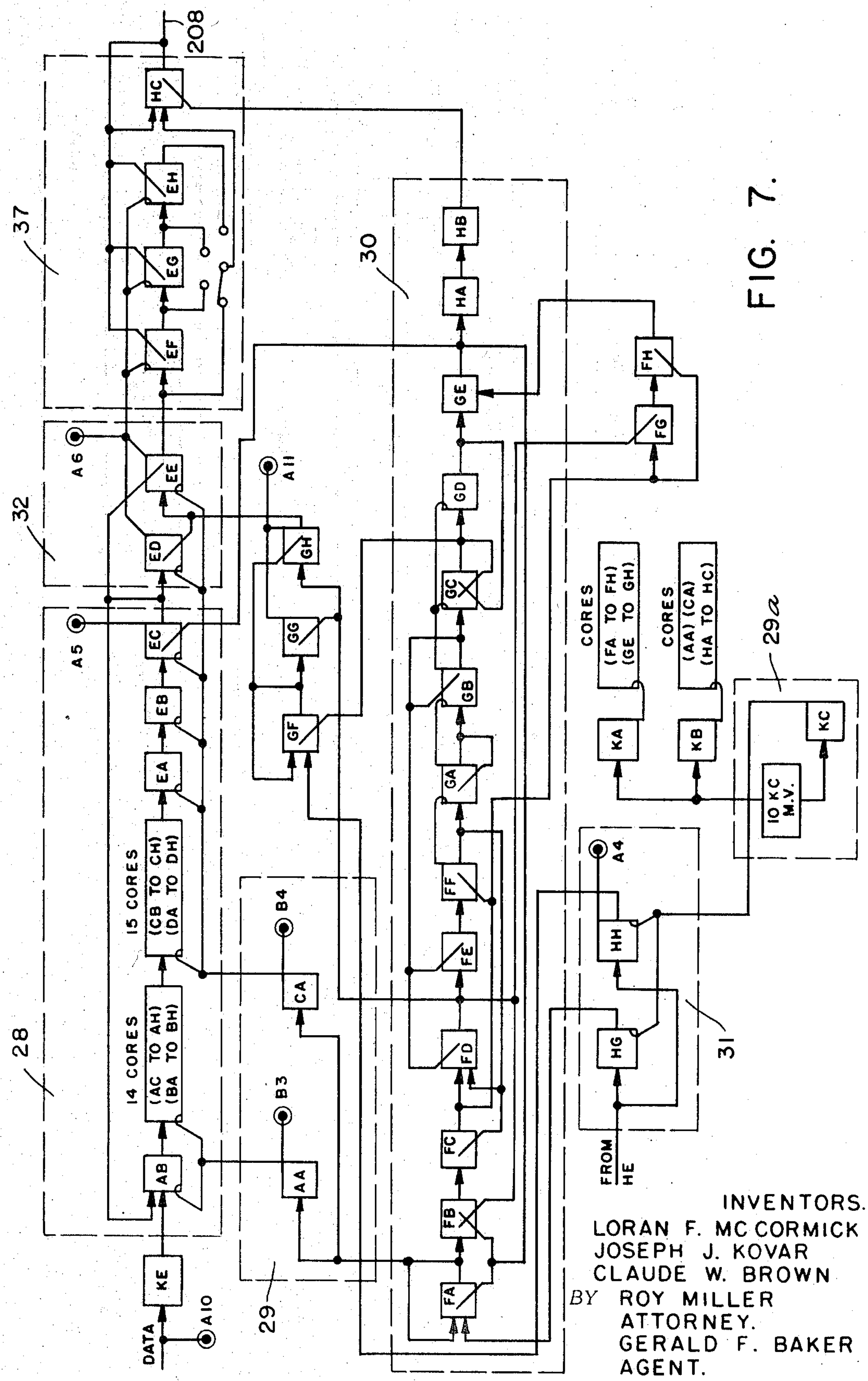
FIG. 7 and 7A together constitute a logic diagram of the Digital Section.
Figure 7A:
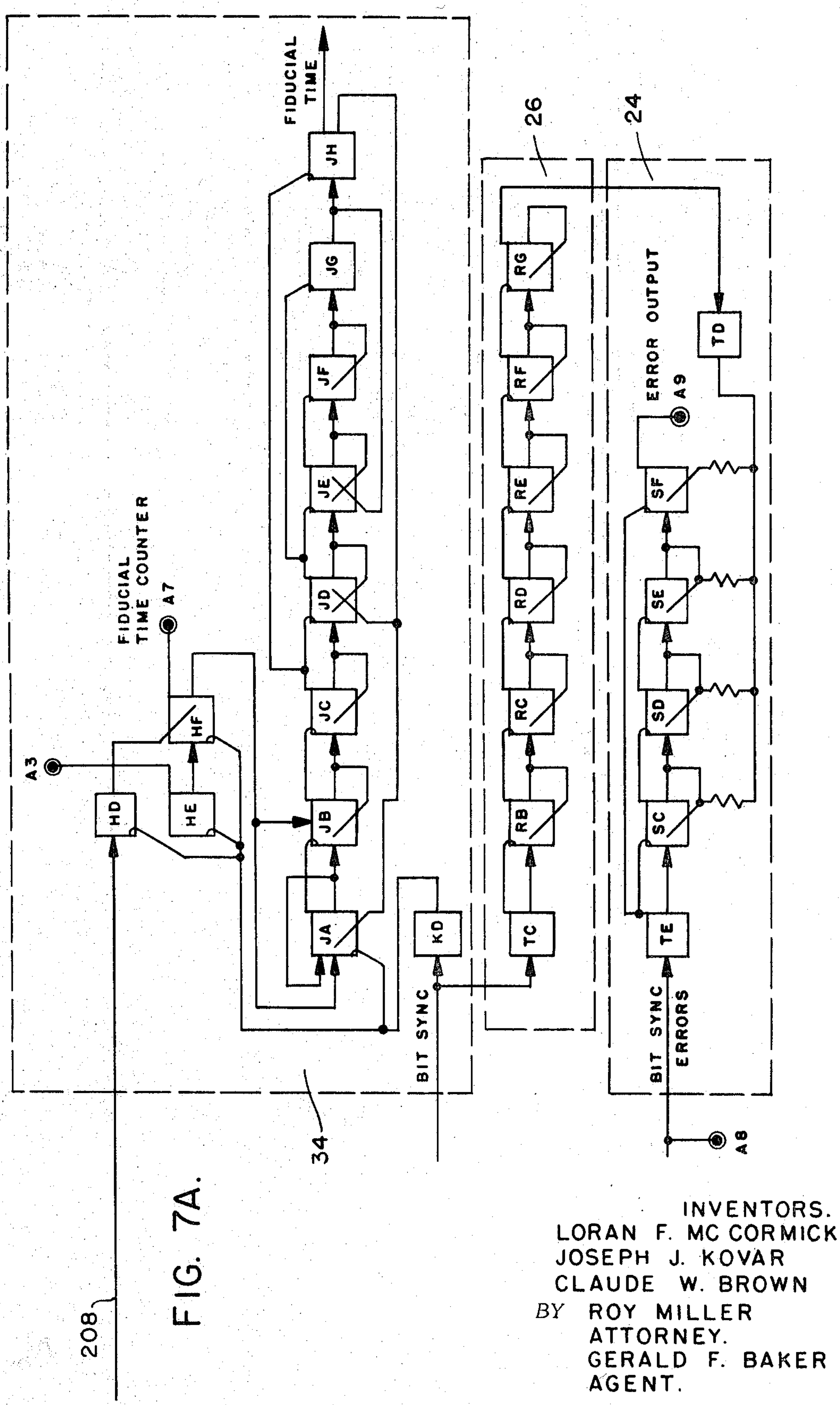
Figure 9:
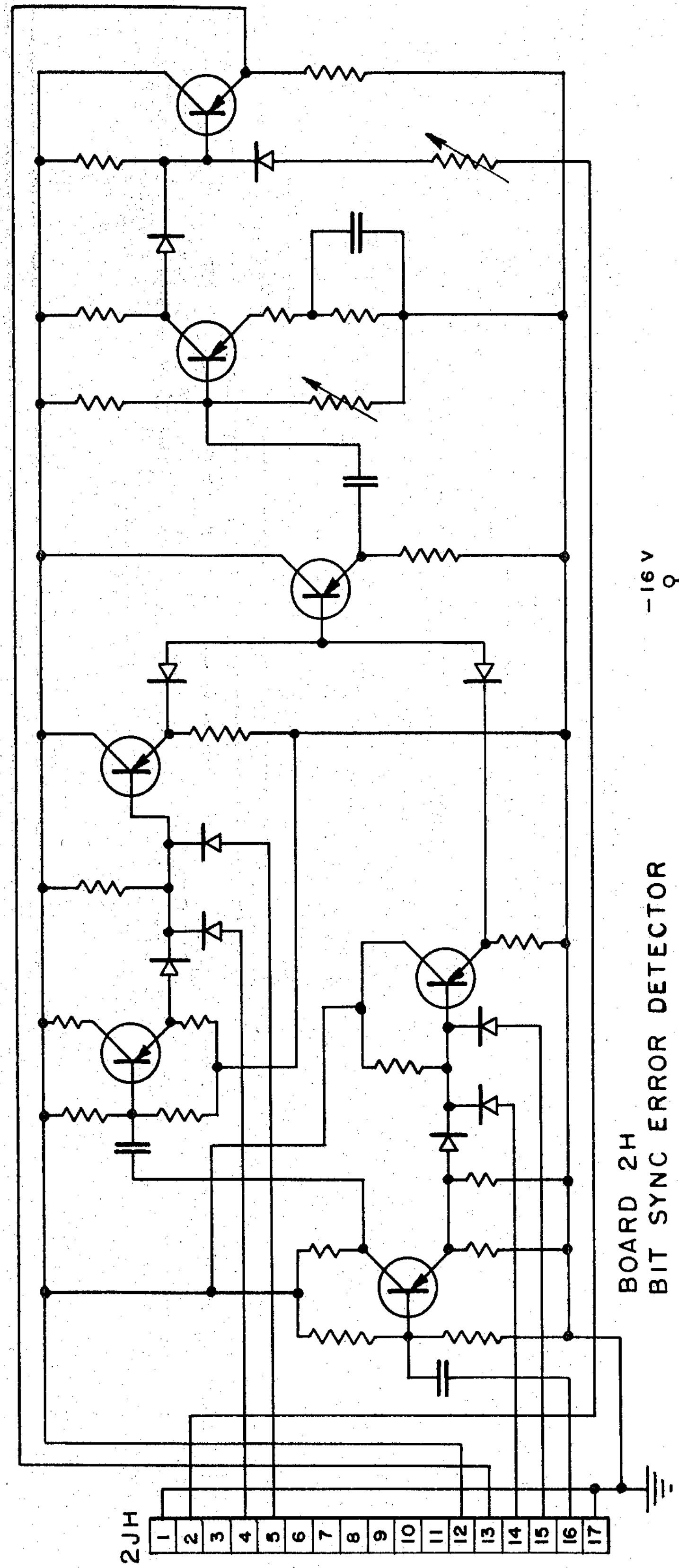
FIGS. 9 and 9A together constitute a schematic diagram of the BIT SYNC Error Detector.

The Comparator 32 is an EXCLUSIVE OR gate consisting of two magnetic logic cores, ED-EE (FIG. 7). An EXCLUSIVE OR gate has an output only when both inputs to the gate are dissimilar. Refer to Table 2 for the Truth of this circuit.

TABLE 2. TRUTH TABLE, COMPARATOR

| Input from 33-bit register | Input from Barker Word Generator | Output from Comparator |
|---|---|---|
| ONE | ZERO | ONE. |
| ZERO | ONE | ONE. |
| ONE | ONE | ZERO. |
| ZERO | ZERO | ZERO. |

Thus, only when the Barker Word is present in its entirety in the register 28, will there be no output from the Comparator 32. If, at any time, the Barker Word is not entirely present without error in the register, there will be, at some time during the scanning, output from the Comparator. Table 3 illustrates this. The Comparator 32 compares the output of the Barker Word Generator 30 to the output of the register 28 bit-by-bit.

The output of the Comparator 32 is applied to the input of the Variable Preset Error Counter, 33.

TABLE 3. Comparison Results

A is the input from the 33-Bit Storage and Shift Register
B is the input from the Barker Word Generator
C is the output of the Comparator Example 1: One bit time before Barker Word is in the register—
A. 011011100000100100011101001000111O
B. 101101110000010010001110100100011l
C. 110110010001101100100111011001001
=17 error (output) pulses Example 2: Baker Word is in the register—
A. 101101110000010010001110100100011l
B. 101101110000010010001110100100011l
C. 000000000000000000000000000000000
=no error (output) pulses Example 3: One bit time after Barker Word is in the register—
A. 110110111000001001000111010010001l
B. 101101110000010010001110100100011l
C. 011011001000110110010011101100100
=16 error (output) pulses

Variable Preset Error Counter

The Variable Preset Error Counter 33 is a switch-controlled shift register to the base three. However, the counter may be adjusted to produce an output pulse after 1, 2, 3, or 4 counts.

The magnetic logic core circuit is shifted by the undelayed output of the Comparator while input to the circuit is from the delayed output of the Comparator. Input is always made to the first stage (core EF, FIG. 7).

The switch 37 is adjustable to select the output of the Comparator directly (0), or the output of the first (1), second (2), or third (3) counter stages. Whichever the switch selects, that output is connected to a gated flip-flop HC. Any input to the gated flip-flop will cause output from it at a 10 kc. rate until it is inhibited. This occurs before the next BIT SYNC CLOCK pulse. The output of the flip-flop is connected to the Fiducial Time Counter, 34.

Fiducial Time Counter

Input to the Fiducial Time Counter 34 is from core HE, a "ONE" generator. Core HE generates a ONE each time a BIT SYNC CLOCK pulse arrives. The Fiducial Time Counter produces an output after 43 such pulses have been generated. The counter is a simple binary counter to the base 43.

The output of the Variable Preset Error Counter 33, core HC, when triggered as described above, inputs core HD at a 10 kc. rate. This causes the input to the Fiducial Time Counter, core HF, to be inhibited, stopping the input of ONE pulses from the ONE generator HE. This prevents any input to the start of the Fiducial Time Counter, core JA. Thus, when there is an output from the Variable Preset Error Counter 33, the input to the Fiducial Time Counter 34 is inhibited.

When there are no errors detected, or the number of errors are within the allowable selected limits (refer to Variable Preset Error Counter, above), the output of the ONE generator HE is not inhibited and a ONE is applied to the Fiducial Time Counter 34 with each BIT SYNC CLOCK pulse. The output of the counter occurs at the 43rd BIT SYNC CLOCK pulse from its start but, because of other circuit delays, this is effectively 45 BIT SYNC CLOCK pulses from the end of the Barker Word. Since the Barker Word is located 45 BIT SYNC pulses before Fiducial Time, it is necessary to count up the BIT SYNC pulses after detection of the Barker Word to output the Fiducial Time pulse at the correct reference time.

The output Fiducial Time Pulse is a single 1 $\mu$s., $-10$ v. pulse.

Test Section

The Test Section provides complete self-test for the Time Recovery Unit. The basic output of the Test Section is a series of data pulses, including the 33-bit Barker Word after every 511 bits. There are errors automatically inserted into the Barker Word to test the error detection ability of the unit, etc. This data is applied to the input of the Digital Section along with time pulses also generated in the Test Section.

Additionally, the Test Section is capable of converting the data pulses as normally received into doublet form so that both the Analog and Digital Sections may be tested. An output is also provided to drive a modulator and a transmitter so as to enable testing of the entire system.

Figures 9A, 10:
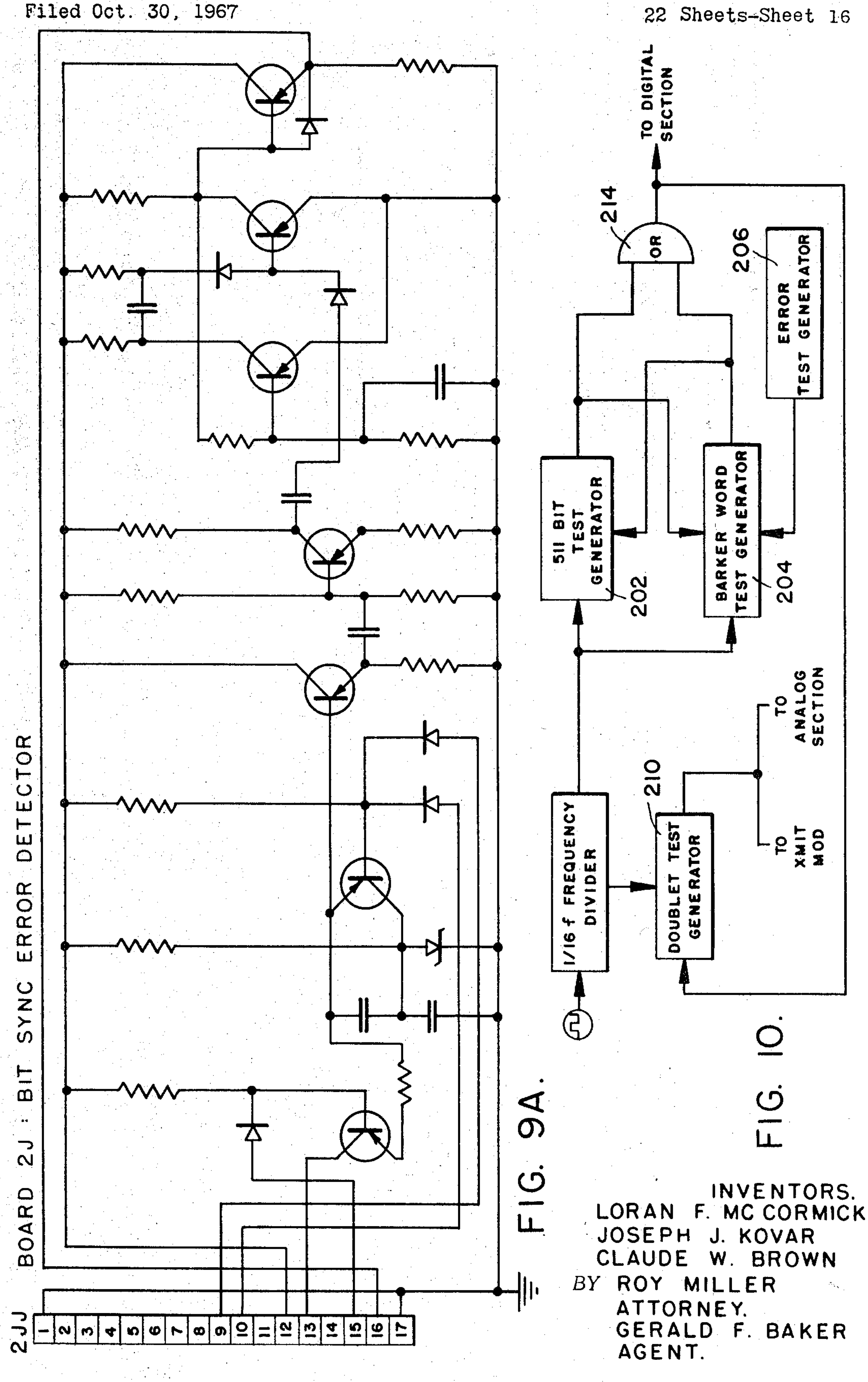
FIG. 10 is a simplified block diagram of the Test Section.

The output of the Test Section is an exact duplicate of a possible satellite transmission and may be used to completely test the unit for proper operation as well as a basis for trouble shooting the unit when malfunctions occur. Refer to FIG. 10 for a simplified block diagram of the Test Section and FIGS. 10A and 10A2 for a logic diagram of the section.

DETAILED CIRCUIT ANALYSIS

There now follows a detailed description of the operation of the system. Each stage is covered in complete detail, including the mathematics of the design where needed, and each circuit is related to others associated directly with the circuit function.

General:

The NACODE Satellite Time Recovery Unit was designed to decode a phase modulated signal having a signal-to-noise ratio of −12 db in a 3 kc. bandwidth. The decoding circuits in the Analog Section 12 require a series of gating signals which are synchronized to the input phase modulated signal. In addition, the input signal carries a timing marker which starts a digital counter. This marker must be detected within ±0.1 millisecond of its actual occurrence.

The approach taken in decoding the phase modulated signal received by the NACODE Satellite Time Recovery Unit involves the use of an Analog Section 12 which consists of three main parts: The Phase Lock Loop 16, the ONE:ZERO Detector 20 and the BIT SYNC Error Detector 22. The VCO 44 in the Phase Lock Loop 16 is locked to the phase modulated signal and the VCO provides the gate signals for the ONE:ZERO and BIT SYNC Error Detectors 20, 22. The ONE:ZERO Detector 20 generates a pulse which corresponds to a binary bit ONE. The BIT SYNC Error Detector 22 establishes and maintains the proper phase relationship (BIT SYNC in-phase) between the incoming phase modulated signal and the gate signals. The outputs of the ONE:ZERO Detector 20 and the BIT SYNC Error Detector 22 in the Analog Section 12 are connected to the inputs of the Digital Section 14.

The Digital Section 14 uses four binary counters, a shift register 28, a pseudo-random pattern generator, and an EXCLUSIVE OR gate to establish a confidence level in case of loss of BIT SYNC, to identify the coded time message and to issue the precisely timed output pulse.

The Test Section contains two pseudo-random pattern generators and a doublet timer to enable simulation of a satellite signal for the entire system or any part thereof.

Analog Section:

The following paragraphs describe the Analog Section 12 (FIG. 2) of the Time Recovery Unit. The section decodes the doublet binary bits in the transmissions, for example, from a satellite. The Analog Section is composed of two principal parts, a Phase Lock Loop 16 for acquiring the signal at −12 db signal-to-noise ratios in a 3 kc. bandwidth, and a detection circuit composed of a ONE:ZERO Detector 20 and a BIT SYNC Error Detector 22 for bit synchronization and doublet decoding.

The Phase Lock Loop 16 is designed using the damping ratio ($\xi$) and the undamped natural frequency ($\omega_n$) as parameters (see FIG. 3B). Since the loop must also lock onto a noisy signal (signal-to-noise power ratio of −12 db in a 3 kc. bandwidth), the effects of noise on the system are considered. It will be found that the noise bandwidth of the loop is 0.11 c.p.s. and the final signal-to-noise (S/N) power ratio is +20 db. A S/N ratio of 10 db was considered sufficient to quickly acquire LOCK. Smaller S/N ratios will still lock, however, they will take longer time.

The detection circuit is composed of two parts. The first part discussed is the BIT SYNC Error Detector 22. This circuit establishes and maintains the correct phase relationship between the incoming doublet and the Phase Lock Loop 16. The second part 20 of the circuit detects the doublet bit which represents a ONE and produces an output pulse. When a ZERO is detected, there is no output.

Both circuits transform the input into a square wave which feeds an RC integrator. The integrator is necessary to average out noise when the input S/N ratio drops towards the −12 db minimum. The polarity of the square wave regulates the direction of charge such that a positive charge produces a pulse output from both circuits.

PHASE LOCK LOOP

Circuit Description:

The Phase Lock Loop 16 consists of boards 2A, 2B, 2D and 2F (FIGS. 8D, 8, 8B, and 8C, respectively). The input doublet is obtained from either the phase detector of the receiver (MODE switch position OPR) or from an internal source (MODE switch position A). This doublet goes through a pair of impedance matching emitter followers and then into a diode full wave rectifier. The output is a square wave (referred to as the singlet frequency), which has a spike in the middle of the negative portion of the wave. This spike will be used to adjust the phase shift in the Phase Lock Loop 16 and to measure the phase shift in the receiver 50.

The square wave next goes into a feedback amplifier 45 which amplifies and inverts the output. A small amount of this signal is passed through a notch filter 46 before being fed back to the base. Since the feedback is 180 degrees out of phase with the input, it cancels all frequencies except the fundamental, which is not in the feedback signal because of the notch filter 46. Since the fundamental is not cancelled, it passes through the amplifier 45 and is amplified to about 10 volts peak-to-peak. Thus the output is a sine wave at the singlet frequency. The filter 46 has a variable resistor which controls the phase of the output with respect to the input. This allows for any phase shift in the Phase Lock Loop 16 to be adjusted out of the circuit.

When the RF input to the receiver drops below −135 dbm, the signal in the amplifier begins to decrease. In order for the circuit to work satisfactorily at signal levels below this, a diode 47 is used. The diode 47 limits the signal to less than 0.5 volt peak-to-peak. The output of the limiter 47 can now be ampified to 6 volts peak-to-peak. Thus, any signal from the filter amplifier 45 which is greater than 0.5 volt will not be clipped when it is again amplified, while smaller signals can be brought up to a useable level. This signal is then amplified to about 6 volts peak-to-peak.

The output from the last amplifier 51 is capacitively coupled to a resistor biasing network which sets the DC level of the signal to a −7 volts.

Board 2B contains the area comparator 48, a filter with a 50-second time constant, and a voltage controlled oscillator (VCO) 44. The area comparator 48 is a gating circuit which samples the signal from board 2A. The gates are two square waves of opposite phase counted down from the VCO frequency. When the loop is locked onto an input frequency, the gates allow ½ the positive part of the input and ½ the negative part to pass. The gates then stop the input from passing and the 50-second filter averages the two voltage levels which were allowed to pass. Should the loop be out of phase with the input, more of the positive signal and less of the negative signal will pass, thus raising the average level in the filter. Since this average level controls the frequency of the VCO 44, a change in level will change the frequency of the VCO so that the gates will once again turn on at the proper times. Since the gates turn on at the ½ way point of the input, the gating signal is 90 degrees out of phase with the input.

The next two boards of the system are boards 2D and 2F. These boards contain flip-flops which are triggered by the VCO 44. The two boards provide all of the gating signals for the analog portion of the circuit. Board 2D has its first flip-flop triggered by the positive going portion of the VCO output. The flip-flop frequency is ½ the VCO frequency. This output is used to trigger the flip-flop used to gate on the area comparator 48 and, therefore, is of the same frequency as the input singlet to board 2A. The third flip-flop (X) occurs at the doublet frequency. This flip-flop groups the two singlet pulses so as to produce a ONE or ZERO in the ONE:ZERO and the BIT SYNC Error Detectors 20 and 22, respectively. If the flip-flop encompasses the wrong portion of the doublet, a pulse from board 2F inhibits one trigger pulse causing the flip-flop to shift over and encompass the doublet.

Board 2F has two flip-flops which are gated so as to provide a square wave which is in phase with the singlet and the doublet. The board also contains a delayed multi-vibrator (DMV) which provides an inhibit signal to flip-flop X board 2D.

Detailed Analysis:

This analysis of the Phase Lock Loop 16 covers: (1) a root locus approach to the design (FIG. 3B), (2) errors caused by various types of inputs, and (3) noise bandwidths associated with the design. The circuits involve the input to the loop 16, which modifies the doublet from the receiver 50 so that it resembles a square wave, followed by the circuits which satisfy the loop design:

It has an open loop transfer function:

$$\frac{e_{in}}{e_{out}}=\frac{R_2Cs+1}{(R_1+R_2)Cs+1}$$

where $s$=Laplace transform of the complex frequency variable. The VCO 44 is the last component to consider. Neglecting gain, it has a transfer function of approximately $1/s$. The overall open loop gain can be lumped together and called K. Thus, the closed loop transfer function is:

$$\frac{\theta_{out}}{\theta_{in}}=\frac{K\left[\frac{R_2Cs+1}{(R_1+R_2)Cs+1}\right]\frac{1}{s}}{1+K\left[\frac{R_2Cs+1}{(R_1+R_2)Cs+1}\right]\frac{1}{s}}$$

Where:

K=Open loop gain
$\theta_{in}$=Phase of the input signal
$\theta_{out}$=Phase of the output signal Rearranging the above equation:

$$\frac{\theta_{out}}{\theta_{in}}=\frac{\frac{K(R_2Cs+1)}{(R_1+R_2)C}}{S^2+\frac{(KRC+1)s}{(R_1+R_2)C}+\frac{K}{(R_1+R_2)C}}$$

The square root of the last term in the denominator is the undamped natural frequency $\omega_n$.

$$\omega_n=\sqrt{\frac{K}{(R_1+R_2)C}}$$

At this point it is necessary to assume some reasonable values for $\omega_n$ and K. It will be shown later that the open loop gain K works out conveniently to be 50 sec.$^{-1}$. Also if $\omega_n$ is equal to 1 radian/sec., then the time constant of the filter ($R_1C$) can be easily found.

$$\omega_n=\sqrt{\frac{50\text{ sec.}^{-1}}{(R_1+R_2)C}}=\frac{\text{radian}}{\text{sec.}}$$

$$(R_1+R_2)C=50\text{ sec.}$$

If $R_1\gg R_2$, then $R_1C=T_1$ and $T_1=50$ seconds.

The damping ratio for the loop is $$\xi=\frac{KR_2C+1}{2\sqrt{KC(R_1+R_2)}}\quad\text{Where }\xi=\text{damping ratio}$$

If $R_2C=T_2$ and $R_1\gg R_2$, then the equation for the damping ratio simplifies to:

$$\xi=\frac{KT_2+1}{2\sqrt{KT_1}}\quad T_2=R_2C,\quad T_1=R_1C\text{ where }R_1\gg R_2$$

A damping ratio of 0.7 should be used for a near optimum linear second-order filter. This would minimize noise power and would also keep the phase error within given boundaries for a step frequency change.[1] Substituting the previous value of gain ($k$) and $T_1$, the time constant $T_2$ of the filter comes out to be:

$$\xi=\frac{(50\text{ sec}^{-1})T_2+1}{2\sqrt{50\text{ sec}^{-1}\times 50\text{ sec}}}=0.7\quad\text{where }T_2=R_2C$$

$$T_2=1.4\text{ seconds}$$

With a damping ratio of 0.7, the response of the system to a unit phase input is 3 seconds.[2] This is a reasonable length of time since the message to be decoded is repeated several times during a satellite pass.

In order to draw a root locus plot of the loop, the open loop transfer function must be considered. This transfer function is:

$$KGH=K\left[\frac{T_{2s}+1}{T_{1s}+1}\right]\frac{1}{s}$$

Where:

K=Open loop gain
G=Forward loop transfer function
H=Feedback transfer function

Substituting previous values of $T_1$ and $T_2$ and dividing the numerator by $T_2$ and the denominator by $T_1$.

$$KGH=K\left(\frac{1.4}{50}\right)\left[\frac{s+\frac{1}{1.4}}{s+\frac{1}{50}}\right]\frac{1}{s}$$

From the function inside the brackets, the root locus plot will have a pole at 0 and at $$-\frac{1}{50}$$

and at zero at $$-\frac{1}{1.4}$$

The root locus can now be drawn as shown in FIG. 4A2. The curve shows that the present operating point is at

[1] Breese, M., Colbert, R., Rubin, W., and Sferrazza, P., "Phase-Locked Loops for Electronically Scanned Antennae Arrays," IRE Trans. on Space Electronics and Telemetry, vol. SET-7, December 1961, p. 99.

[2] Savant, C. J., Basic Feedback Control System Design, New York: McGraw-Hill, 1958, Fig. 1-12, p. 12.

a damping ratio of 0.7. The root locus plot also indicates that the circuit will be stable for any loop gain (K). As will be shown later, the gain of the system is proportional to the input voltage levels and will vary from a high of 50 to a low of 0. The response ($\omega_n$) of the system is the distance from the origin to the operating point on the curve. As the gain decreases, the operating point moves to the right, so the response time to a unit phase step input will increase. Also, the damping ratio ($\xi$) is the cosine of the angle between $\omega_n$ and the abscissa of the graph. This angle will increase as the gain decreases, decreasing the damping of the system and causing overshoot to occur. Thus, a decrease in circuit gain will effect the system's response, however, the loop will be stable for all operating conditions.

Since this is a second-order or type 1 servo system, it will have a 0 steady-state error for a phase-step input and a constant error for a phase-ramp input. Consider a phase-ramp input equal $\theta_r/S^2$ $$\theta_e = \lim_{s\to o} s\left(\frac{\theta_r}{S^2}\right)\left[\frac{1}{1+K\left[\frac{T_2s+1}{T_1s+1}\right]\frac{1}{s}}\right]$$

Where $\theta_e$=phase error

Taking the limit of $\theta_e$, as $s$ approaches 0, $$\theta_e = \frac{\theta_r}{K}$$

For a gain (K) of 50:

$$\theta_e = \frac{\theta_r}{50}$$

The largest allowable error for satellite timing is 3.5°, so:

$$\theta_e = \frac{\theta_r}{50\,\text{sec.}^{-1}} = 3.5°$$

$$\theta_r = 175\ \frac{\text{degrees}}{\text{sec.}}$$

Thus, the input frequency variations can be no larger than:

$$\frac{\theta_r}{S^2} = \frac{175°}{\text{sec.}} \times \frac{1}{360}\ \frac{\text{cycle}}{\text{decrees}} \approx 0.5\ \text{c.p.s.}$$

The frequency change in the input signal from the satellite due to the Doppler effect is less than 0.005 c.p.s., so errors due to Doppler should be negligible. The gain is proportional to $\theta_r$, so the gain can theoretically be reduced by a factor of 100 before the Doppler variations could give a significant error.

The bandwidth ($B_n$) of the loop is shown by Breese et al.[3] to be:

$$B_n = \int_{-\infty}^{+\infty} |H_1(\omega)|^2 df$$

$$\text{Where } H_1(s) = \frac{\left(\frac{KT_2}{T_1}\right)s + \frac{K}{T_1}}{s^2 + \left(\frac{1}{T_1} + \frac{KT_2}{T_1}\right) + s\frac{K}{T_1}}$$

This is the closed loop transfer function shown previously, with:

$$T_1 = (R_1+R_2)C$$
$$T_2 = R_2C$$

Breese et al., also show that the integral now becomes:

$$B_n = \int_{-\infty}^{+\infty} |H_1(\omega)|^2 df = \frac{K\left(\frac{KT_2^2}{T_1}\right)+1}{4(KT_2+1)}$$

This is the equation of the loop bandwidth. The bandwidth can be calculated by using the values previously shown:

$$B_n = \frac{K\left(\frac{KT_2^2}{T_1}\right)+1}{4(KT_2+1)}$$

K=100 sec.$^{-1}$
$T_1$=50 seconds
$T_2$=1.4 seconds $$B_n = \frac{100\left(\frac{100\times1.4^2}{50}\right)+1}{4(100\times1.4+1)}$$

=0.72 rad./sec. or 0.11 c.p.s.

It is now possible to look at the circuits (FIGS. 8, 8B, 8C, and 8D) used in the loop of FIG. 3. The first circuit in the loop 16 is the area comparator 48, a four diode gating arrangement shown in FIG. 8. The upper and lower diode inputs are square waves used to gate the output of the comparator 48 on or off. With the square wave near ground on the upper gate and near the supply voltage on the lower gate, the input is allowed to pass the filter 46. When the square waves change state, the input is cut off and the output remains at the voltage on the filter capacitor 103. Since the input and output of the filter 46 are high impedance circuits, there is essentially no change in the capacitor voltage when the diode gate is turned off. The component values in the filter 46 are calculated from the time constants shown previously.

The next circuit in the loop is a voltage controlled astable multivibrator (VCO) 44 running at 400 c.p.s. (4 times the frequency of the signal coming into Phase Lock Loop 16). Varying the input voltage either side of −8 volts, changes the output by approximately 7 c.p.s. per volt. This input voltage comes from the filter 46 and depends upon the phase of the loop input waveform in relation to the phase of the VCO 44. With the VCO 44 lagging 90 degrees behind the input, the loop is phase locked and the voltage from filter 46 into VCO 44 is near −8 volts.

Figure 8:
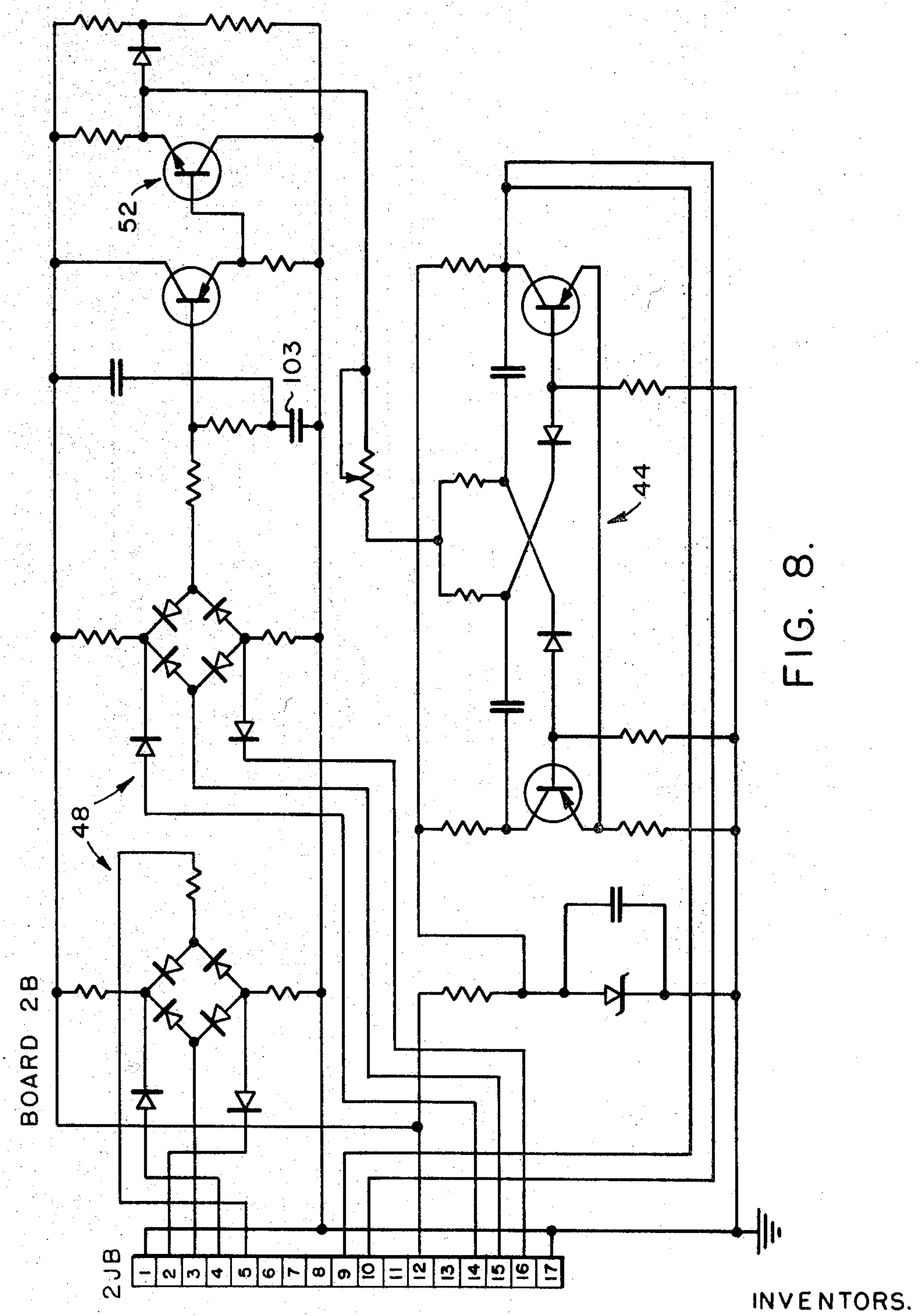
FIG. 8 is a schematic diagram of circuit board 2B of the Phase Lock Loop.
Figure 8A:
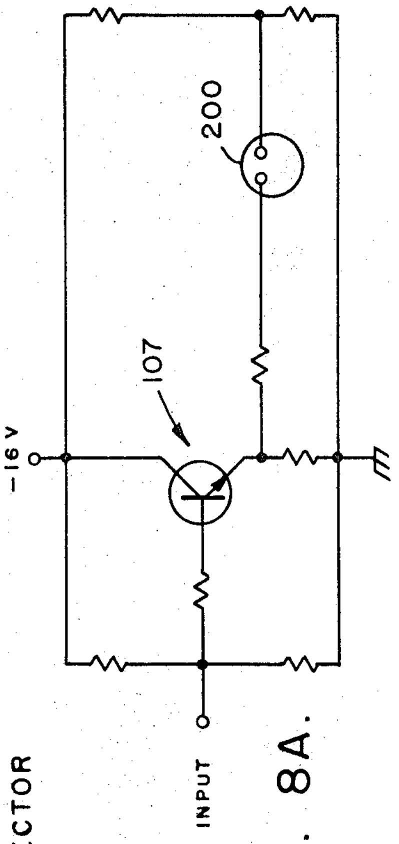
FIG. 8A is a schematic diagram of the Lock Meter Circuit.
Figure 8B:
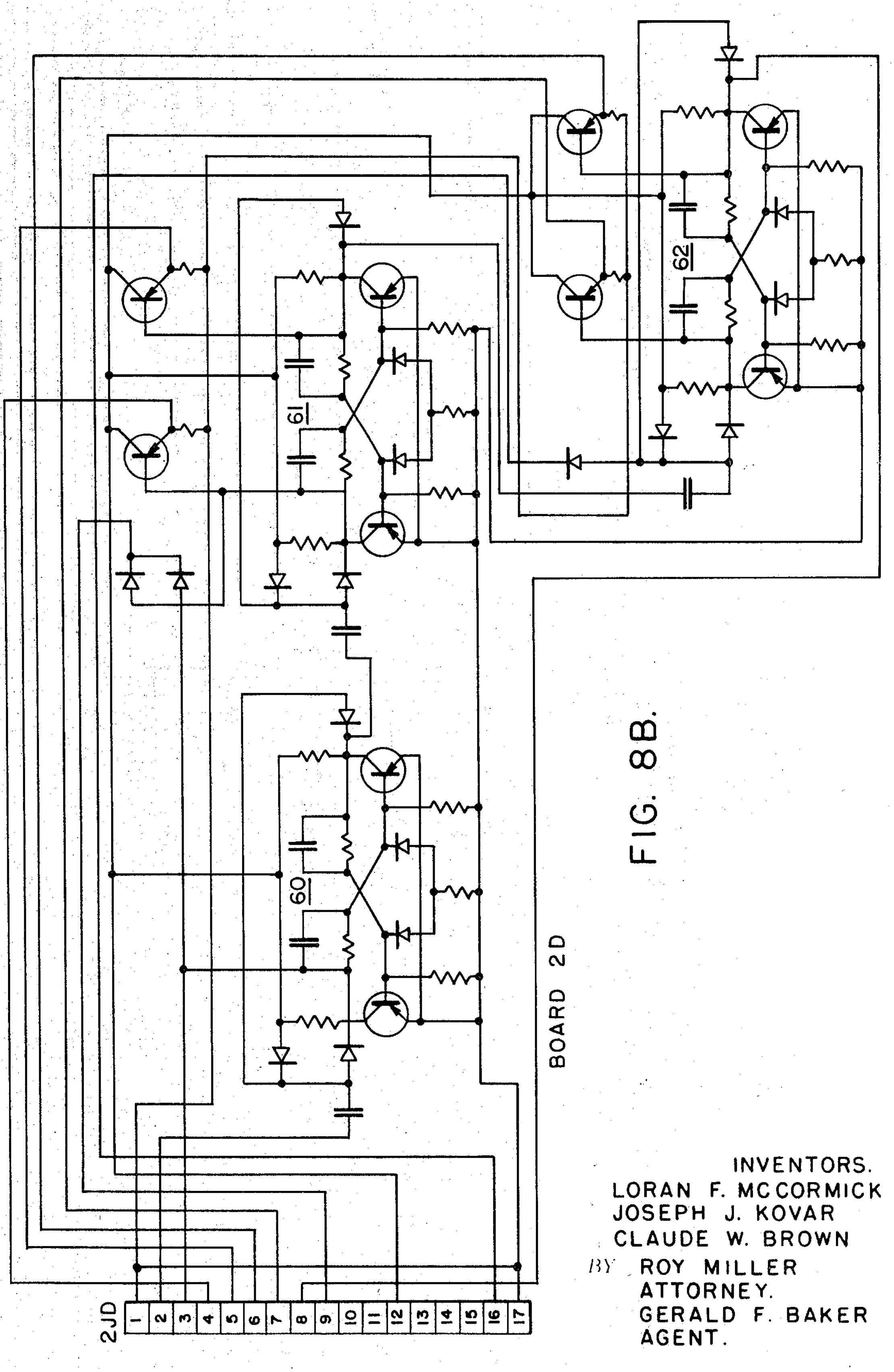
FIG. 8B is a schematic diagram of Board 2D of the Phase Lock Loop.
Figure 8C:
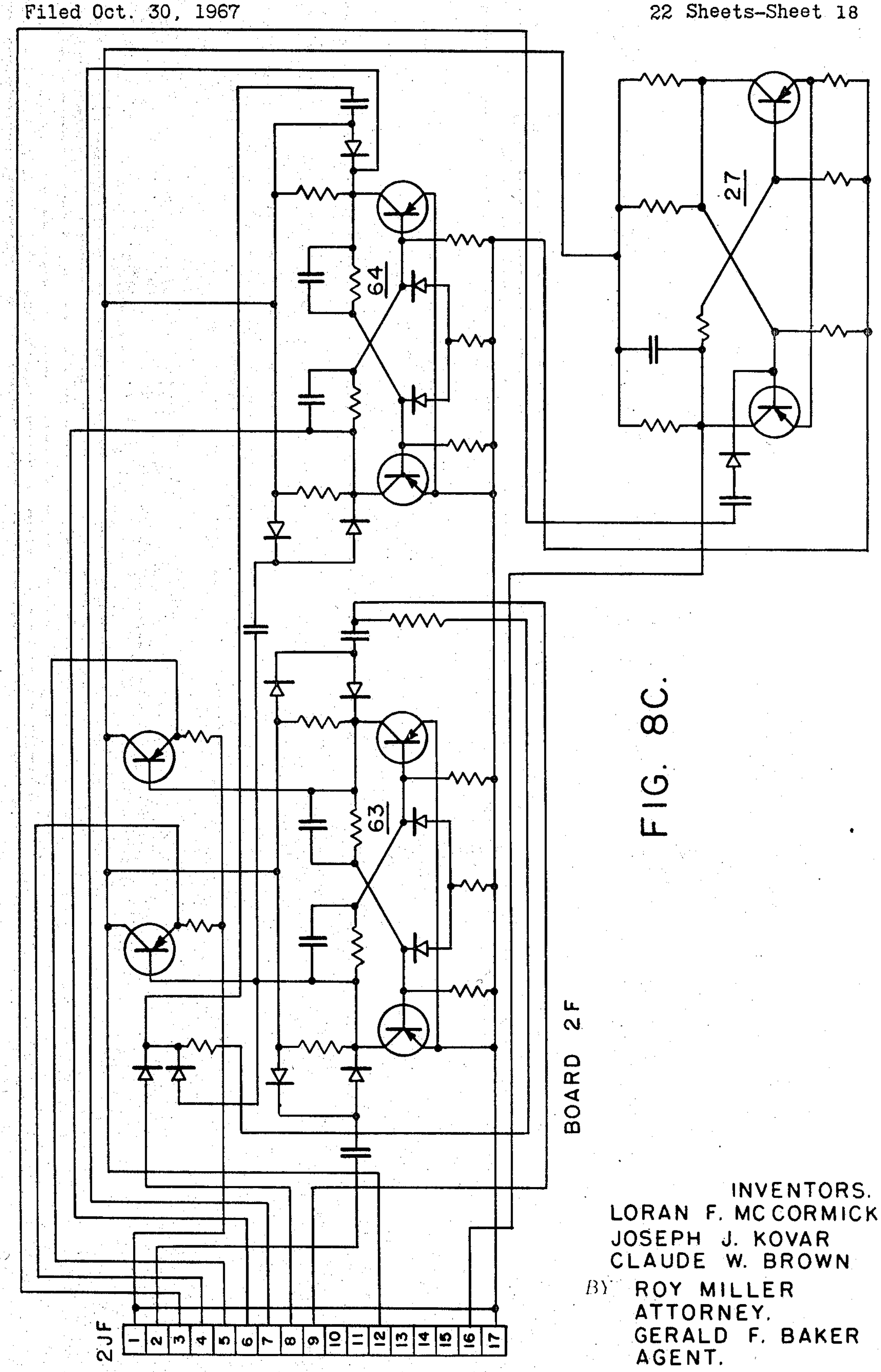
FIG. 8C is a schematic diagram of Board 2F of the Phase Lock Loop.

The BIT SYNC Error Detector 22 needs several gate signals which have a constant phase relationship with the input signal to the loop. In order to obtain these constant phase waveforms, the VCO 44 triggers a group of flip-flops. These flip-flops, shown in FIGS. 8B and 8C, provide all of the gate signals used in the detector circuits. The block diagram, FIG. 3; shows the frequencies of the flip-flops in relation to the VCO frequency. For VCO frequency of 400 c.p.s., flip-flops V, W, and X are running 200 c.p.s., 100 c.p.s., and 50 c.p.s., respectively. Y flip-flop 63 is triggered by a diode gate such that the left collector of the flip-flop is always +90 degrees out of phase from the right collector of the 100 c.p.s. flip-flop above. The last flip-flop (Z) 64 is triggered in such a manner that it puts out a pulse at the beginning of each doublet input from the receiver.

Figure 5C:
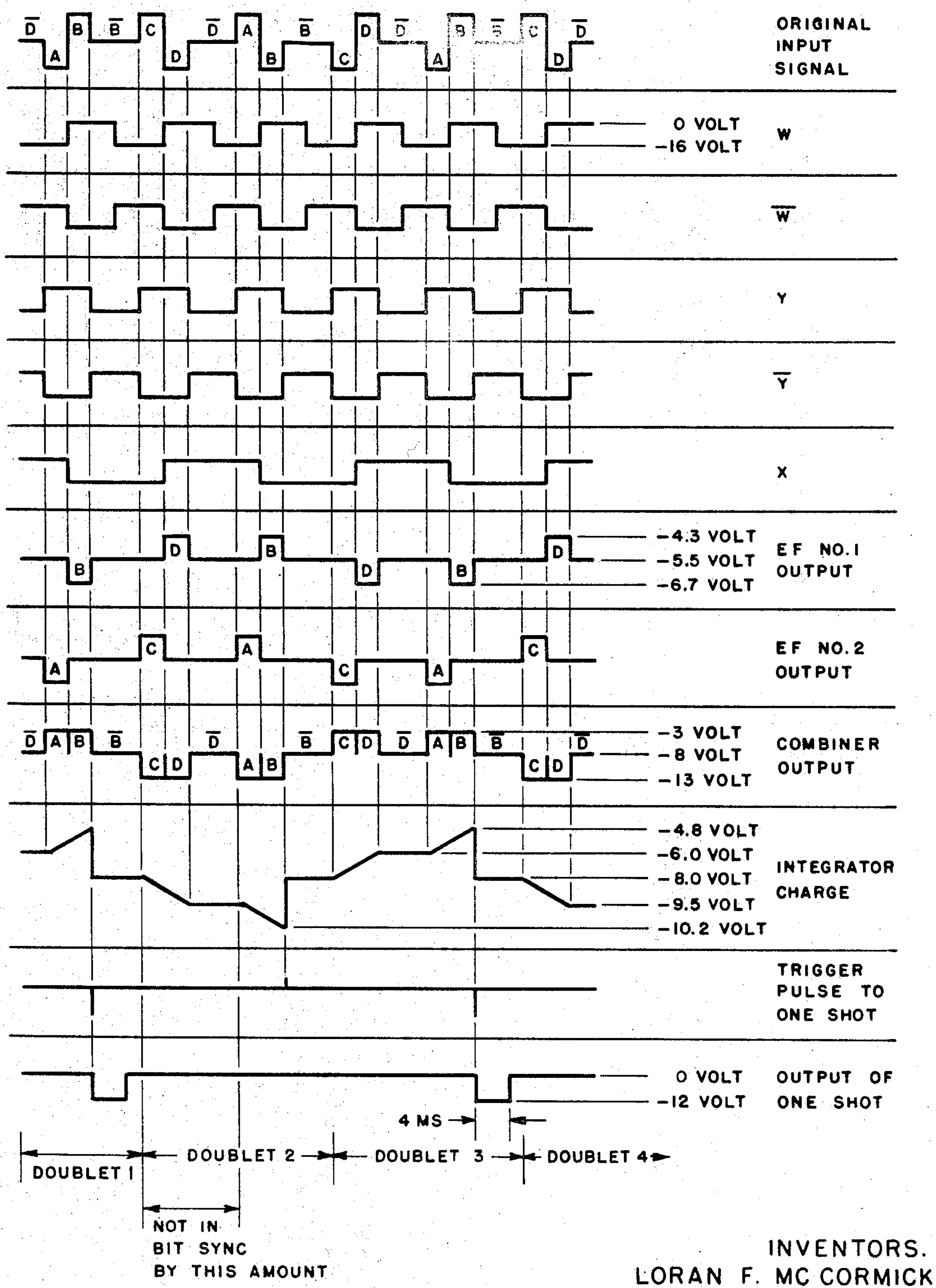
FIG. 5C is a graphic representation of a typical waveform history in the BIT SYNC Error Detector. $\overline{\text{IN}}$ BIT SYNC.

Flip-flop (X) 62 is phase controlled by a pulse from the BIT SYNC Error Detector 22. If the flip-flop is not in the proper phase with the input doublet as shown in FIG. 5C, then the BIT SYNC Error Detector 22 feeds a pulse into a delay multivibrator 27 which inhibits one trigger pulse from flip-flop W. This results in a 180-degree phase change in flip-flop X. The phase relation of these flip-flops to the incoming signal is shown in FIGS. 5B and 5C.

The circuits preceding the Phase Lock Loop 16 are used to transform the doublet waveform into a square wave which can be used by the Phase Lock Loop 16. In order to make the change, the doublet is first rectified, then filtered an dlimited so as to provide a constant signal input amplitude to the Phase Lock Loop 16 over a wide range of signal-to-noise ($S/N$) ratios.

Figure 8D:
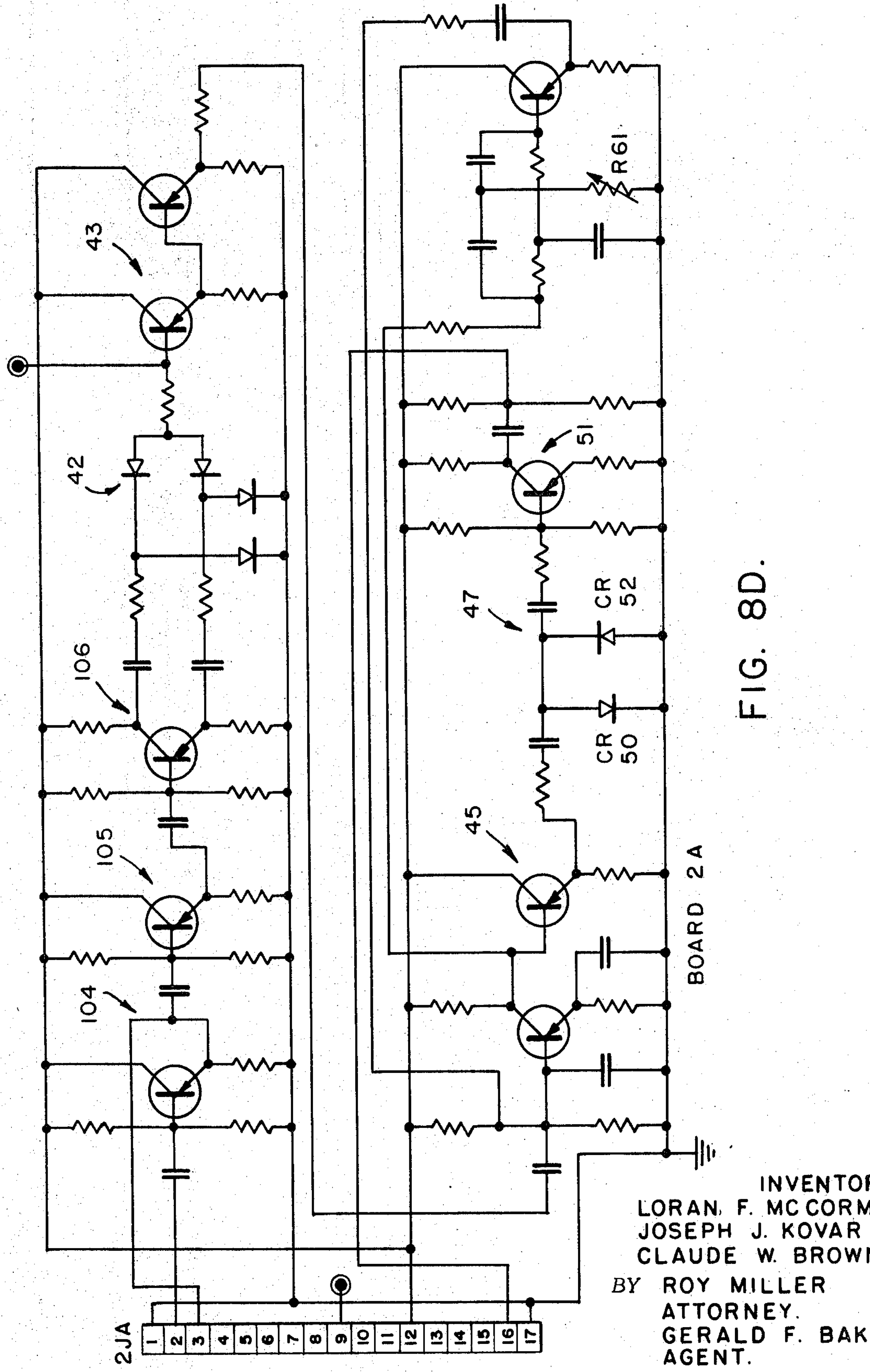
FIG. 8D is a schematic diagram of Board 2A of the Phase Lock Loop.
Figure 11:
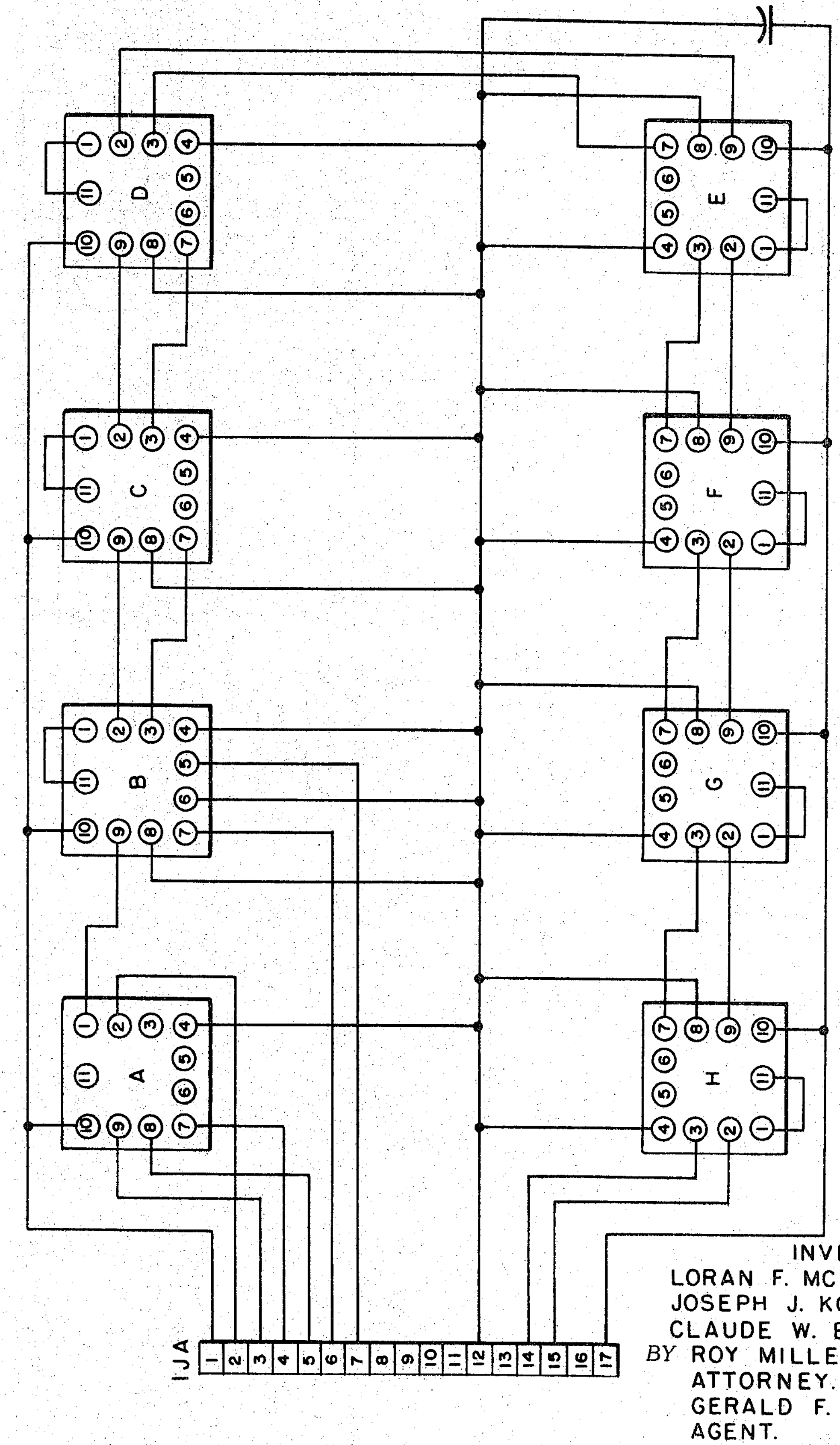
FIG. 11 is a schematic illustration of the arrangement of magnetic cores on a typical circuit board.

The doublet enters the top circuit as shown in FIG. 8D. It passes through two impedance matching emitter followers 104, 105 and then into an amplifier 106 where

[3] Breese et al., supra, pp. 96–97.

the 3-volt peak-to-peak signal is amplified to 8 volts peak-to-peak. This signal then goes into a transistor phase splitter and diode full wave rectifier 42. The output of the rectifier 42 is a square wave with a period equal to one-half the period of the doublet. A very high impedance emitter follower circuit 43 follows to keep from loading the rectifier.

The circuits in the lower portion of FIG. 8D begin with a feedback amplifier 45 acting as a bandpass filter. The pass band is less than 10 c.p.s. on either side of the 100 c.p.s. input. The phase of the output is 180 ±20 degrees with respect to the input. This phase is set with the 10 k. potentiometer R61 shown at the end of the circuits. The output of the bandpass amplifier 45 is 12 volts peak-to-peak. This goes into a limiter 47 consisting of back-to-back diodes CR 50 and 51. The 0.5 volt limited signal is again amplified to 8 volts and fed into the Phase Lock Loop.

The limiter 47 accomplishes two purposes. First, it squares the sine wave coming out of the filter so that the Phase Lock Loop 16 has more gain. Second, a low amplitude output from the filter, which would occur with signal-to-noise ratios less than 1, will be of a constant amplitude going into the loop until the signal from the filter falls below 0.5 volt. Thus, the gain of the loop is held up over a wider range of *S/N* ratios than normally possible.

It is now possible to see the effects of noise upon the system. The Phase Lock Loop 16 is supposed to track an input signal with a −12 db *S/N* in a 3 kc. bandwidth. For *S/N* ratios less than 0 db, the diode rectifier 42 in the input circuit nearly doubles the noise expressed as db.[4] Thus, a −12 db *S/N* ratio at the input reduces to −24 db at the output of the rectifier 47. After being rectified, the signal passes through the 20 c.p.s. bandpass amplifier 51. The amplifier 51 decreases the bandwidth of the input signal by a factor of about 130. This increases the *S/N* ratio by 21 db so the signal going into the loop has a *S/N* ratio of −3 db in a 20 c.p.s. bandwidth. The 0.11 c.p.s. bandwidth of the loop reduces the input signal bandwidth by a factor of 108 which increases the *S/N* ratio by 23 db so the effective *S/N* ratio in the loop is +20 db in a 0.11 c.p.s. bandwidth.

For reliable acquisition of a signal, the *S/N* ratio should be +10 db.[5] Since the *S/N* ratio of the loop is well above this level, the loop should work successfully for the required input.

In actual use, the loop appears to hold lock for the required *S/N* input. However, the amplitude of the signal at −12 db *S/N* is down to a level near 1 volt at the input to the loop. Thus, the lop will probably track signals with much lower *S/N* than is now possible if another limiter and amplifier were used. This would bring the level of the loop's input signal to 8 volts for these low *S/N* ratios.

Lock Meter Drive:

The output of board 2A also goes into the Quadrature Comparator 49. This circuit has gates which turn on when the input goes positive and off when it goes negative (consider the Phase Lock Loop 16 as now properly locked to the input signal). The average output level will be greater than when no signal is present or when the Phase Lock Loop 16 is not in proper phase. This signal passes from the Quadrature Comparator 49 to a meter circuit (FIG. 8A) just behind the meter on the front panel. The meter circuit has an emitter follower 107 to provide the current to operate the meter 200. Since the meter response is slower than the input square wave, the meter 200 actually averages the gated input to indicate a DC level. The meter should show a constant amplitude if the loop is locked onto the input signal.

ONE:ZERO Detector

The ONE:ZERO Detector circuit consists of two printed circuit boards (FIGS. 4A1 and 4A2) and is shown in block diagram form in FIG. 4. These two boards occupy positions 2K and 2L respectively in the time recovery unit. The phase modulated input to board 2K comes from a pair of impedance matching emitter followers (see FIG. 2). The gain of the phase splitter stage 72 is set so that at equal amplitude, but 180 degrees out of phase, signals appear at the collector and emitter of the phase splitting transistor $Q_1$. The phase modulated signal from the collector is fed to a DC restorer $Q_2$ which sets the DC level of the signal to equal the DC level of the signal seen at the emitter of the phase splitter $Q_1$. This is necessary because the signal from emitter follower gate 1 (75) and emitter follower gate 2 (75*a*) will be combined and must have identical DC values.

The gate signals which are applied to the ONE:ZERO and the BIT SYNC Error Detectors 20 and 22 respectively are derived from the VCO 44 through a series of divide-by-two circuits. Emitter follower gate 1 (75) is gated on by gate signals $\overline{X}$ and $\overline{Y}$ (FIG. 4B) only during the portions of the phase modulated signal marked B and C, the emitter follower gate 2 (75*a*) is gated on by gate signals X and $\overline{Y}$ (FIG. 4B) only during the portions of the phase modulated signal marked A and D. These gates signals are shown with respect to the phase modulated signal in FIG. 4B. A diode (CR7, CR8) is connected from the emitter in each of the emitter follower gates 75, 75*a* to the base of a transistor $Q_5$. Diode combining is accomplished in this way.

The integrator 80 comprising R24 and C5 (Board 2L) is designed to integrate positive and negative signals with respect to a set reference. Since the system has a −16 volt supply it is desirable to set the integrator reference to −8 volts DC. The reference adjust adjusts the zero degree portion of the phase modulated signal to −8 volts. The output of board 2K is the output of the −8 volt reference adjust and the binary signal shown in FIG. 4B. A transistor on circuit board 2L is connected in series with the integrator circuit. This transistor serves as a gate or integrator switch 79 which disconnects the integrator from the input signal by the use of gate signal $\overline{Y}$ and it does so when the phase modulated signal is at zero degrees. There are two reasons for this; the first is to keep the integrator 80 from discharging between signal pulses, and the second is to prevent noise from being integrated during the times mentioned above. The sequential operation of the integrator 80 can now be traced.

When pulse AB (FIG. 4B) arrives at the integrator 80, the integrator is connected to the input signal and it charges to some value. The transistor gate (integrator switch 79) is now opened by gate signal $\overline{Y}$ and the charge remains in the integrator 80 until time CD, when the integrator is again reconnected and charges to a new value. The integrator 80 is again disconnected from the input circuit and the integration capacitor C5 is discharged by the use of a transistor switch $Q_9$ which is connected across the integration capacitor. The transistor switch $Q_9$ is turned on by gate signals X and Y.

If, after integration, the results are positive with respect to the −8 volt reference, a trigger pulse 81P will be generated by the discharge of the integration capacitor. This trigger pulse, shown in FIGS. 4 and 4B, will be amplified in the integrator discharge circuit and will be used to trigger a one shot or delay multivibrator (DMV) 82. The DMV output 82P is fed to the digital section.

BIT SYNC Error Detector

The BIT SYNC Error Detector circuit 22 (FIGS. 9 and 9A) consists of two printed circuit boards occupying

[4] Van Vorrhis, S. N., ed. Microwave Receivers. New York: McGraw-Hill, 1948. (Massachusetts Institute of Technology Radiation Laboratory Series, vol. 23) pp. 211–212.

[5] Space Electronics Corp., "An Electronic Self-Focusing Tracking System," Final Report. Glendale, Calif., November 1960 (Report No. 3OR–1, Contract No. AF19(604)7238 Prepared for Air Force Cambridge Research Laboratories, Bedford, Mass).

positions 2H (FIG. 9) and 2J (FIG. 9A). The description in paragraphs immediately supra dealt with the operation of the ONE:ZERO Detector 20 when bit synchronization was in phase. This means that integration in the ONE: ZERO Detector 20 was carried out on a complete binary bit such as pulses AB and CD in FIG. 4B. There will be two considerations given to the BIT SWNC Error Detector 22; one will be when the system is BIT SYNC in-phase and the second will be when the system is BIT SYNC out-of-phase. BIT SYNC out-of-phase means that integration in the ONE:ZERO Detector 20 is carried out on ½ of one binary bit CD and ½ of the next binary bit AB. The BIT SYNC Eror Detector 22, shown in block diagram form in FIG. 4, is similar to the ONE:ZERO Detector 20 circuit; in fact there is only one component change from the ONE:ZERO Detector circuit 20. If circuit C11 (FIG. 4A2) is removed from the ONE:ZERO Detector circuit 20, the BIT SYNC Eror Detector circuit 22 (FIG. 9) results. This capacitor is an emitter bypass capacitor and its removal from the circuit greatly reduces the gain of the triger amplifiers. This is necessary because it is undesirable to generate BIT SYNC error commands due to noisy signals. The other difference between the two detectors is in the gate signals which are applied to the emitter follower gates.

Emitter follower gate 1 (95) is gated on by gate signals $\overline{W}$ and $\overline{Y}$ (FIG. 5B) only during the portions of the phase modulated signal marked B and D, and emitter follower gate 2 (**95*a*) is gated on by gate signals W and $\overline{Y}$ (FIG. 5B) only during the portion of the phase modulated signal marked A and C. The gate signals are shown with respect to the phase modulated signal. Reference to FIG. 5B will show that the waveforms in this detector are similar to the waveforms in the ONE:ZERO Detector circuit 20, however, mention should be made of the integrated signal in the BIT SYNC circuit. FIG. 5B shows that the integration result is ZERO. Thus, there is no output from the one-shot or DMV 82 when the system is BIT SYNC out-of-phase, the following conditions exist. Emitter follower gate 1 (95) is gated on only during portions of the signal marked D and B, and emitter follower gate 2 (95*a*) is gated on only during portions of the signal marked C and A (see FIG. 5C). The gate signals are again shown here. There is a positive value in the BIT SYNC Error Detector integrator 100. This integrator circuit now works the same way as does the ONE:ZERO Detector 20 circuit when the system is BIT SYNC in-phase. The DMV 102 output is seen corresponding to the trigger pulse. The output of the BIT SYNC DMV 102 is counted in the Digital Section 14 and when a count of nine is reached, the counter 24 triggers a one-shot DMV 27 in the Phase Lock Loop section 16. The one-shot DMV output is used to inhibit one trigger pulse to the X and $\overline{X}$ flip-flop 62**. This causes the flip-flop to shift its output by one-half cycle which establishes BIT SYNC in-phase.

DIGITAL SECTION

The Digital Section is made up of: four binary counters—(1) the BIT SYNC Eror Counter 24, (2) the BIT SYNC Error Clear Counter 26, (3) the Variable Preset Error Counter 3, and (4) the Fiducial Time Counter 34; one pseudo-random pattern generator, the Barker Word Generator 30; one shift register, the 33-Bit Storage and Shift Register 28; an EXCLUSIVE OR gate, the Comparator 32; and a synchronizer, the 10 KC to BIT SYNC Synchronizer 31.

The BIT SYNC Eror Counter 24 is driven by the output of the BIT SYNC Error Detector 22 in the Analog Section 12. Each detected error is transferred into the counter 24 and, when nine errors have ocurred without the counter being cleared, the counter emits a pulse through a one-shot or a DMV 27 (FIG. 6), which inhibits one count to the 50 c.p.s. flip-flop driving the gates 75, **75*a* of the ONE:ZERO Detector 20 and the BIT SYNC Error Detector 22**.

The BIT SYNC Error Clear Counter 26 is driven by BIT SYNC CLOCK pulses from the VCO 44 in the Analog Section 12 and every 64th count outputs a pulse through a shift driver that resets the BIT SYNC Error Counter 24. This output leaves every core in the BIT SYNC Error Counter 24 in its ZERO state.

The 33-Bit Storage and Shift Register 28 accepts one bit of data into the first storage core. The register is then shifted 34 times at a 10 kc. burst rate, ending with the previous bits shifted by 1 storage core in the shift register, with the input core cleared and ready to accept another data bit. The output of the register is shifted into the Comparator 32.

The Barker Word is generated at the same 10 kc. rate as the 33-Bit Storage and Shift Register every time a BIT SYNC CLOCK pulse occurs. The output of the 33-Bit Storage and Shift Register 28 is compared with the output of the Barker Word Generator 30 and when the two compare, recognition is assumed.

The Variable Preset Error Counter 33 will allow zero, one, two or three errors, depending on ERROR switch position, to occur in the data Barker Word and still allow recognition of the Barker word.

Once recognition of the Barker Word has been accomplished, the Fiducial Time Counter 34 is commanded to start. At the 45th BIT SYNC CLOCK pulse after recognition, the counter will give an output switch is denoted as FIDUCIAL TIME.

The 10 kc. square wave oscillator 29 performs two functions. The BIT SYNC CLOCK pulse is synchronized with the leading edge of the 10 kc. square wave and starts the Barker Word Generator 30 and 10 kc. burst shift pulses. The 10 kc. burst shift pulses are in phase with the trailing edge of the 10 kc. square waves.

BIT SYNC Error Counter

The BIT SYNC Error Counter 24 is a simple binary counter (to the base 9) made up of magnetic logic cores. These sealed logic and memory blocks are self-contained and include all circuitry needed to perform the logic function desired. In the logic diagram of the Digital Section 14, FIGS. 7 and 7A, it will be noted that a new variety of logic symbol is used for these circuits and that no static logic symbols are indicated. This specification does not cover the operation of these components further than the fact that they perform a specific logic function. However, further study of the publication: "The Application of Magnetic Core Logic to Digital-Data Manipulation" (available from Di/An Controls, Inc., 40 Leon St., Boston, Mass., February 1959). is recommended. All further discussion of the logic circuits of this unit will presume that this understanding exists. Input to the counter is error pulses from the output of the BIT SYNC Error Detector 22 in the Analog Section 12. These pulses are applied to core TE, a core driver. The output of TE is applied to core SC, the start of the counter 24. On the eighth error pulse, a count is shifted into core SF, the last core in the counter. The next (ninth) count, shifts the count out of core SF because the undelayed output of core TE is also connected to SF as a shift input. The output of SF is connected to the DMV 27 on board 2F where it produces a pulse which inverts the output of the ⅛*f* flip-flop 62, correcting the count.

BIT SYNC Error Clear Counter

The BIT SYNC Error Clear Counter 26 is another simple binary counter, also made of magnetic logic cores, this time to the base 64. Input consists of time pulses, BIT SYNC CLOCK pulses from the VCO 44 in the Analog Section 12. Input is made through core TC, a core driver 25, into core RB, the first stage of the counter 26. The counter 26 is straight-forward in operation, the undelayed output shifting the following stage and the delayed output clearing the core and inputting the next stage. Output of the counter 26 is applied to a reset driver 35 which is connected to reset all the stages of the BIT SYNC Error Counter 24. This occurs each 64th BIT SYNC CLOCK pulse.

Barker Word Generator

The Barker Word Generator 30, like all the circuits in the Digital Section 14, is composed of a series of magnetic logic cores. Cores FA through FH and GA through GH (refer to FIGS. 7 and 7A) make up a pseudo-random pattern generator, the output, core GH, being the 33-bit Barker Word. Every time a BIT SYNC CLOCK pulse occurs at core KD (which gives an output on negative going edge), cores HG and HH are inputted from the ONE generator, core HE. When the next 10 kc. pulse from core KC occurs, cores FA and GF will be inputted. These two cores FA and GF are wired as a flip-flop and will give an output every time a 10 kc. shift pulse occurs, until inhibited. The shift pulses for these two cores occur 180 degrees out-of-phase with cores HG and HH, thus, no interference can occur when cores FA and GF are inputted and shifted.

The output of core GB is a pulse occurring once for every 11 pulses of flip-flop core FA; the output of core GC is one pulse for every 22 pulses of flip-flop core FA; the output of core GD is one pulse for every 33 pulses of flip-flop core FA; and the output of core GE is one pulse for every 34 pulses of flip-flop core FA. The output of core GE inhibits core FA causing the flip-flop to stop after a count of 34 pulses and also inhibits core EC in the 33-bit Storage and Shift Register 28.

The output of core FD is the complement of the 11-bit Barker Word (00011101101) and is repeated three times. This output is inputted into core GH and inhibits core GG. It will be noted here that core GF is a flip-flop that started at the same time as core FA and is turned off at the 22nd pulse of core FA by core GC, therefore, flip-flop core GF is on for twenty-two 10 kc. pulses.

Cores GG and GH form an EXCLUSIVE OR function, an output at core GH occurring only when the two pulses from cores GF and FD are not ONES or ZEROS simultaneously. Since core GF has a continuous output for 22 pulses, the output of core GH will be the complement of core FD for 22 pulses and will be the same as core FD for the remaining eleven bits, giving the output at core GH of the 33-bit Barker Word (BW, BW, BW) (111000100101110001001000011101101). This complete cycle of generator of the 33-bit Barker Word occurs at a 10 kc. rate and is repeated every time a BIT SYNC CLOCK pulse occurs.

It will be noted that flip-flop core FA also inputs cores AA and CA. These two cores are used to shift the 33-Bit Storage and Shift Register and together they form the 34-bit 10 KC Burst Generator 29 in conjunction with core FA.

10 KC to BIT SYNC Synchronizer

The 10 KC to BIT SYNC Synchronizer 31 is made up of cores HG and HH. When a BIT SYNC CLOCK pulse is applied to core KD, ONE generator HE is shifted and puts out a pulse. This pulse is applied to the inputs of cores HG and HH, among others. Cores HG and HH are continuously being shifted by the output of core KC which is a core driver driven by the ouput of the 10 kc. multivibrator 29. As soon as there is something in cores HG and HH to be shifted out (the BIT SYNC CLOCK pulse), the output of KC shifts that bit out. This is connected as the input to FA and GF which are wired as a flip-flop. Each other 10 kc. pulse, applied directly to KA and KB, causes the Barker Word Generator 30 and the 33-Bit Storage and Shift Register 28 to function. The effect of HG and HH is, therefore, to pass the first 10 kc. pulse after each BIT SYNC CLOCK pulse, so as to synchronize the 10 kc. pulses to the BIT SYNC CLOCK pulses.

33-Bit Storage and Shift Register

Each data bit will precede the BIT SYNC CLOCK pulse by approximately 5 milliseconds, depending on which satellite is tracked. This data bit is shaped by core KE, which gives an output on the negative going edge, the inputted into core AB. The BIT SYNC CLOCK pulse then starts the Barker Word Generator 30 at a 10 kc. rate. This also starts core shift drivers AA and CA at a 10 kc. rate. The 33-Bit Storage and Shift Register 28 is shifted 34 times. The purpose of these 34 shift pulses is to input each bit serially into core ED of the Comparator and to shift each bit back into the register.

When 33 shift pulses occur, each bit is in the same location as it started, with the exception of core EC. On the 33rd shift pulse, the incoming bit to core EC is inhibited, leaving the core in its ZERO state. On the 34th shift pulse, each bit is shifted one more core, leaving core AB now in its ZERO state. The cycle is continuously repeated each time a BIT SYNC CLOCK pulse occurs.

It will be noted here that the shift pulses from cores AA and CA are delayed by one shift pulse. This is to compensate for delays of the Barker Word so that the Barker Word will reach the Comparator circuit 32 at the same time as the data from the 33-BIT Storage and Shift Register 28.

Comparator

The comparator 32 forms what is known logically as an EXCLUSIVE OR circuit. If both inputs to the Comparator 32, cores ED and EE, are either ZEROS or ONES there will be no output. See Comparator Truth Table, Table 2. Only when the inputs do not compare, will there be an output of the Comparator 32. Therefore, when the Barker Word from the Barker Word Generator 30 is compared against the 33 bits in the storage register 28 and the 33 bits in the storage register is the Barker Word from the satellite, there will be no output from the Comparator 32.

Variable Preset Error Counter

The Variable Preset Error Counter 33 is controlled by ERROR switch SW2.

The undelayed output of the Comparator 32 is used to shift error detect cores EF, EG, and EH. Whenever the Comparator 32 does not compare, the undelayed output will shift these three cores. The current is then delayed through core EE and inputted into cores EF and HC, providing switch SW2 is in the 0 error position.

Once core HC has an input, it will continue to have an output due to the flip-flop action of this core, at a 10 kc. rate, as long as it is not inhibited. The output is fed to the input of core HD and to the inhibit windings of cores EF, EG, and EH. This inhibit of cores EF, EG, and EH is used as a means of clearing these cores. As long as core HC is outputting, it will continually shift out cores EF, EG, and EH. This is to make sure that these cores are cleared before another BIT SYNC CLOCK pulse occurs.

Core HC continually inputs core HD at a 10 kc. rate, once an error occurs. In order to stop core HC after the comparing cycle is completed, core HC is inhibited by core HB. The output of core HB is a pulse occurring at the 36th, 10 kc. pulse after core FA is started. Since core FA is turned off on the 34th pulse, the comparing cycle has been completed but core HC is left on till cores EF, EG, and EH are cleared.

Since core HD is shifted at the BIT SYNC CLOCK rate, there is no interference between the output of core HC, thus, the input of core HD and the shifting of core HD.

When one error occurs in the data Barker Word, the output of the Comparator 32 will have one error. If switch SW2 is in the 1 error position, the undelayed current out of the Comparator 32 will shift cores EF, EG, and EH (there should be nothing in them at this time because they were previously cleared), and the delayed current will be inputted into core EF. Since there are no more errors, the Comparator 32 will not give out any further shift pulses and core HC will not be inputted because the error in core EF will not be shifted into core HC. Therefore, one error has been detected.

If there are three errors in the data Barker Word, the output of the Comparator 32 will show these three errors. Switch SW2 is now in the 3 error position. Each time an error occurs at the output of the Comparator 32 it shifts the first error into core EF, the second error into core EG, and the third error into core EH. Since there are no more errors in the data Barker Word, there will be no more shift outputs of the Comparator 32. Since switch SW2 is in the 3 error position, there will not be any output of core EH and again core HC will not be inputted.

If switch SW2 was in the 2 error position and had these three errors occurred, the same time the third error was going into core EH, flip-flop core HC would have been inputted. Therefore, recognition of the data Barker Word would not have been accomplished.

Fiducial Time Counter

It was noted previously that when BIT SYNC occurs, the complete comparison cycle is started and, if any errors had occurred due to the data Barker Word not being in the 33-Bit Storage and Shift Register, there would be errors occurring at the output of core HC. Since core HC feeds core HD at a 10 kc. rate, the cycle is completed before another BIT SYNC CLOCK pulse occurs. Anytime an error is present, core HD will be inputted. On the next BIT SYNC CLOCK pulse, the output of core HD is shifted into the inhibit of core HF, inhibiting the ONE coming from the ONE generator, core HE. On the next BIT SYNC CLOCK pulse, since core HF is in the ZERO state, there will not be an input into core JA, the start of the Fiducial Time Counter 34.

When the Barker Word is in the 33-Bit Storage and Shift Register 28 and comparison is made, recognition is assumed. Core HC is not inputted and core HD is not inputted. On the next BIT SYNC CLOCK pulse after recognition, the ONE generator, core HE, will input core HF because core HD will not have an output and not inhibit core HF. On the second BIT SYNC CLOCK pulse after recognition, the output of core HF will input flip-flop core JA, starting the Fiducial Time Counter 34. The Fiducial Time Counter 34 then counts the BIT SYNC pulses until the correct time count is present at core JH. The output of core JH is the Fiducial Time Pulse, which also stops the Fiducial Time Counter 34 by inhibiting cores JA and JD.

The output of core HF also inputs core JB. This is to present a count into the counter so the counter will output fudicial time at the correct time.

511-Bit Test Generator

The 511-Bit Test Generator is a pseudo-random pattern generator whose pattern (Table 4) follows the equation $X_n = X_{n-9}X_{n-5} + \overline{X_{n-9}X_{n-5}}$. The last nine bits delivered by the generator each cycle consist of nine ZERO counts. The output of the 511-Bit Test Generator, which normally inhibits the operation of the Barker Word Test Generator, now permits the Barker Word Test Generator to start. The output of the Barker Word Test Generator inhibits the operation of the 511-Bit Test Generator while it operates. At the end of the Barker Word, the 511-Bit Test Generator is again permitted to function until it again produces nine consecutive ZERO counts at the end of its cycle, starting the Barker Word Test Generator. Table 5 shows the composite Barker Word and 511-bit count.

TABLE 4.—OUTPUT OF 511-BIT TEST GENERATOR

The following binary output sequence is generated according to the equation:

$$X_n = X_{n-9}X_{n-5} + \overline{X_{n-9}X_{n-5}}$$

for a total of 511 bits. The last nine bits are ZERO counts.

| | | | | | | | | | |
|---|---|---|---|---|---|---|---|---|---|
| 00000 | 00001 | 11110 | 00010 | 00001 | 11010 | 00110 | 01101 | 11110 | 11010 |
| 11000 | 10010 | 11100 | 00110 | 00001 | 10010 | 01110 | 10101 | 10111 | 00011 |
| 10010 | 01010 | 10001 | 11011 | 00111 | 01110 | 11111 | 11101 | 11101 | 11001 |
| 11101 | 10001 | 10101 | 01001 | 11100 | 10000 | 10110 | 01000 | 11011 | 10101 |
| 11101 | 01001 | 01100 | 00001 | 00110 | 11011 | 01001 | 00000 | 01101 | 10010 |
| 10110 | 01100 | 11111 | 11001 | 11001 | 10101 | 11001 | 01101 | 00000 | 00101 |
| 11010 | 01110 | 00101 | 00110 | 10011 | 00001 | 11000 | 00100 | 01011 | 11100 |
| 10100 | 10010 | 00100 | 11111 | 01001 | 01000 | 00101 | 01010 | 11111 | 10101 |
| 10101 | 00001 | 10100 | 01000 | 11111 | 10001, | 10001 | 01101 | 10000 | 10100 |
| 01010 | 11101 | 10111 | 10011 | 00011 | 11010 | 00010 | 01001 | 10010 | 11110 |
| 00100 | 00111 | 1 | | | | | | | |

TABLE 5. COMBINED OUTPUT: 511-BIT TEST GENERATOR AND TEST BARKER WORD GENERATOR

| | | | | | | | | | |
|---|---|---|---|---|---|---|---|---|---|
| 00001 | 11000 | 10010 | 11100 | 01001 | 00001 | 11011 | 01000 | 00111 | 11000 |
| 01000 | 00111 | 01000 | 11001 | 10111 | 11011 | 01011 | 00010 | 01011 | 10000 |
| 11000 | 00110 | 01001 | 11010 | 10110 | 11100 | 01110 | 01001 | 01010 | 00111 |
| 01100 | 11101 | 11011 | 11111 | 10111 | 10111 | 00111 | 10110 | 00110 | 10101 |
| 00111 | 10010 | 00010 | 11001 | 00011 | 01110 | 10111 | 10101 | 00101 | 10000 |
| 00100 | 11011 | 01101 | 00100 | 00001 | 10110 | 01010 | 11001 | 10011 | 11111 |
| 00111 | 00110 | 10111 | 00101 | 10100 | 00000 | 10111 | 01001 | 11000 | 10100 |
| 11010 | 01100 | 00111 | 00000 | 10001 | 01111 | 10010 | 10010 | 01000 | 1 011 |
| 11101 | 00101 | 00000 | 10101 | 01011 | 11110 | 10110 | 10100 | 00110 | 10001 |
| 00011 | 11110 | 00110 | 00101 | 10110 | 00010 | 10001 | 01011 | 10110 | 11110 |
| 01100 | 01111 | 01000 | 01001 | 00110 | 01011 | 11000 | 10000 | 1111 | |

Barker Word Test Generator

The Barker Word Test Generator functions in the same manner as the Barker Word Generator (30) in the Digital Section 14 but is shifted at a different rate.

The outputs of both the 511-Bit Test Generator and the Barker Word Test Generator are applied to the input of the OR gate. Since only one or the other of the two outputs can be present at any one time, the OR gate applies this output to the MODE switch for the selection of the type of output from the Test Section.

Doublet Test Generator

The doublet is generated in the manner indicated by the timing pattern in FIGS. 3–15, the logic diagram for the Doublet Test Generator. The flip-flop counts down the input BIT SYNC frequency (which is either generated internally or from an external source) by 16.

The output of the Doublet Test Generator may be connected either to the input to the Analog Section or, through a modulator or transmitter, to the input to the entire system.

Error Test Generator

The Error Test Generator consists of a ONE generator and a magnetic core switch. The generator provides from zero to three ONE counts every other cycle of the Barker Word Test Generator. The number of these ONE counts is determined by a switch. The ONE counts are inserted into the normal output of the Barker Word Test Generator as errors to verify the action of the Comparator 32, Variable Preset Error Counter 33, and the inhibit function of the Fiducial Time Counter 34 input in the Digital Section 14.

Obviously many modifications and variations of the present invention are possible in the light of the above teachings. It is, therefore, to be understood that within the scope of the appended claims the invention may be practiced otherwise than as specifically described.

What is claimed is:

1. A data transmitting system having a source of coded information pulses and means for receiving said information pulses; said receiving means comprising:

(a) Analog means for converting said coded information pulses into TIME and DATA pulses, and (b) Digital means, (c) said Analog means comprising;

(1) phase lock means producing gating signals, synchronizing said gating signals with said information pulses and producing said TIME pulses, (2) first demodulating means decoding said information pulses and converting said coded information pulses into ONE and ZERO binary bits to produce a DATA output, (3) second demodulating means producing output pulses indicative of an improper timed relationship between the binary bits produced by said first demodulating means and gating signals of said phase lock means to produce an ERROR output, (d) said Digital means comprising;

(1) means generating a DATA comparison signal, (2) comparator means receiving said DATA pulses and said DATA comparison signal and issuing a significant output upon coincidence of said comparison signal with said DATA pulses, and (3) timer means continuously receiving said TIME pulses and connected to said comparator means for receiving said output thereof, (e) said timer means responsive to receipt of said TIME pulses and receipt of said output from said comparator to issue a fiducial time output pulse.

2. A data transmitting system according to claim 1 wherein;

said information pulses are doublet coded phase modulated signals, and said receiving means comprises a phase modulation receiver.

3. A data transmitting system according to claim 1 wherein said Digital means further comprises;

means for receiving and counting ERROR outputs from said second demodulating means, and means responsive to a selected ERROR output count to automatically adjusting to eliminate ERROR signals attributable to improper synchronization of said gating signals with said DATA pulses.

4. A data transmitting system according to claim 3 wherein;

said information pulses are doublet coded phase modulated signals, and said receiving means comprises a phase modulation receiver.

References Cited

UNITED STATES PATENTS 3,069,504 12/1962 Kaneko ............. 179—15

ROBERT L. GRIFFIN, Primary Examiner

A. H. HANDAL, Assistant Examiner

U.S. Cl. X.R.

178—69.5; 179—15; 325—321